(12) United States Patent
Doman et al.

(10) Patent No.: US 12,504,156 B2
(45) Date of Patent: Dec. 23, 2025

(54) OUTDOOR PORTABLE LIGHT

(71) Applicant: Homesports, LLC, Lindon, UT (US)

(72) Inventors: Bryce Doman, Alpine, UT (US);
Emmanuel Karlsson, Orem, UT (US);
Tye Kerr, Lindon, UT (US)

(73) Assignee: Homesports, LLC, Lindon, UT (US)

(*) Notice: Subject to any disclaimer, the term of this patent is extended or adjusted under 35 U.S.C. 154(b) by 0 days.

(21) Appl. No.: 18/446,419

(22) Filed: Aug. 8, 2023

(65) Prior Publication Data
US 2024/0133542 A1  Apr. 25, 2024

Related U.S. Application Data

(60) Provisional application No. 63/395,943, filed on Aug. 8, 2022.

(51) Int. Cl.
| | | |
|---|---|---|
| *F21V 21/14* | (2006.01) | |
| *F21L 14/00* | (2006.01) | |
| *F21V 21/08* | (2006.01) | |
| *F21V 21/22* | (2006.01) | |
| *F21Y 103/10* | (2016.01) | |
| *F21Y 115/10* | (2016.01) | |

(52) U.S. Cl.
CPC ........... *F21V 21/145* (2013.01); *F21L 14/00* (2013.01); *F21V 21/08* (2013.01); *F21V 21/22* (2013.01); *F21Y 2103/10* (2016.08); *F21Y 2115/10* (2016.08)

(58) Field of Classification Search
CPC ........ F21V 21/145; F21V 21/08; F21V 21/22; F21L 14/00; F21Y 2103/10; F21Y 2115/10
See application file for complete search history.

(56) References Cited

U.S. PATENT DOCUMENTS

| | | | |
|---|---|---|---|
| 11,306,905 B1* | 4/2022 | Liao | F21V 21/30 |
| 2013/0188373 A1* | 7/2013 | Lin | F21S 6/002 |
| | | | 362/410 |
| 2018/0058647 A1 | 3/2018 | He et al. | |
| 2019/0137055 A1 | 5/2019 | Liu et al. | |
| 2020/0355359 A1 | 11/2020 | Pan et al. | |

FOREIGN PATENT DOCUMENTS

CN    212294425 U  *  1/2021

OTHER PUBLICATIONS

PCT International Search Report issued Jan. 3, 2024, International Application No. PCT/US2023/071880, filed Aug. 8, 2023, 11 pages.

* cited by examiner

*Primary Examiner* — Bao Q Truong
(74) *Attorney, Agent, or Firm* — Thorpe North & Western, LLP; David W. Osborne

(57) ABSTRACT

Devices and associated methods for an outdoor portable light are described. In one embodiment, an outdoor portable light can comprise a frame including a frame segment having a frame segment length and cross-sectional area, and a light segment having a light segment length and cross-sectional area that is substantially equal to the frame segment length and cross-sectional area. In one aspect, the light segment can comprise a light source housing holding a light source strip. Methods for stabilizing an outdoor portable light and facilitating assembly and disassembly of an outdoor portable light are also provided.

25 Claims, 36 Drawing Sheets

OUTDOOR PORTABLE LIGHT

PRIORITY DATA

This application claims the benefit of U.S. Provisional Patent Application Ser. No. 63/395,943, filed on Aug. 8, 2022 which is incorporated by reference in its entirety.

BACKGROUND

Outdoor lighting can be used for different kinds of activities, events, and purposes such as recreational sports, camping, hiking, outdoor gatherings, landscaping, city infrastructure, security, and decoration. A few examples of outdoor lights include floodlights, landscape lights, motion sensor lights, and spotlights. These outdoor lights can use a large amount of voltage, can be stationary, and can be bulky. Therefore, devices and methods that can provide a convenient way of providing outdoor lighting with adequate portability, ease of assembly and disassembly, and compactness without sacrificing stability, luminosity, or suitability for multiple purposes would be useful.

SUMMARY

In one embodiment, an outdoor portable light can comprise a frame including a frame segment having a frame segment length and cross-sectional area, and a light segment having a light segment length and cross-sectional area that is substantially equal to the frame segment length and cross-sectional area. In one aspect, the light segment can comprise a light source housing holding a light source strip, and an outer housing.

In another embodiment, a method is provided for stabilizing an outdoor portable light. In one aspect, the method can comprise selecting a weight ratio between a frame and a light segment of greater than 3:2. In another aspect, the method can comprise matching a length and cross-sectional area of the light segment to a length and cross-sectional area of a frame segment of the frame. In another aspect, the method can comprise selecting a Young's modulus for the frame segment to stabilize the outdoor portable light in an upright orientation.

In another embodiment, a method for facilitating assembly and disassembly of an outdoor portable light is provided. In one aspect, the method can comprise matching a length and cross-sectional area of a light segment to a length and cross-sectional area of a frame segment of a frame. In another aspect, the method can comprise selecting a total curvature for an arcuate frame segment of the frame of less than about 10°. In another aspect, the method can comprise anchoring a reversible frame segment anchor to a fixed structure.

There has thus been outlined, rather broadly, the more important features of the disclosure so that the detailed description thereof that follows may be better understood, and so that the present contribution to the art may be better appreciated. Other features of the present disclosure will become clearer from the following detailed description of the disclosure, taken with the accompanying drawings and claims, or may be learned by the practice of the disclosure.

BRIEF DESCRIPTION OF THE DRAWINGS

Features and advantages of technology embodiments will be apparent from the detailed description which follows, taken in conjunction with the accompanying drawings, which together illustrate, by way of example, various technology features; and, wherein.

Figure 1:
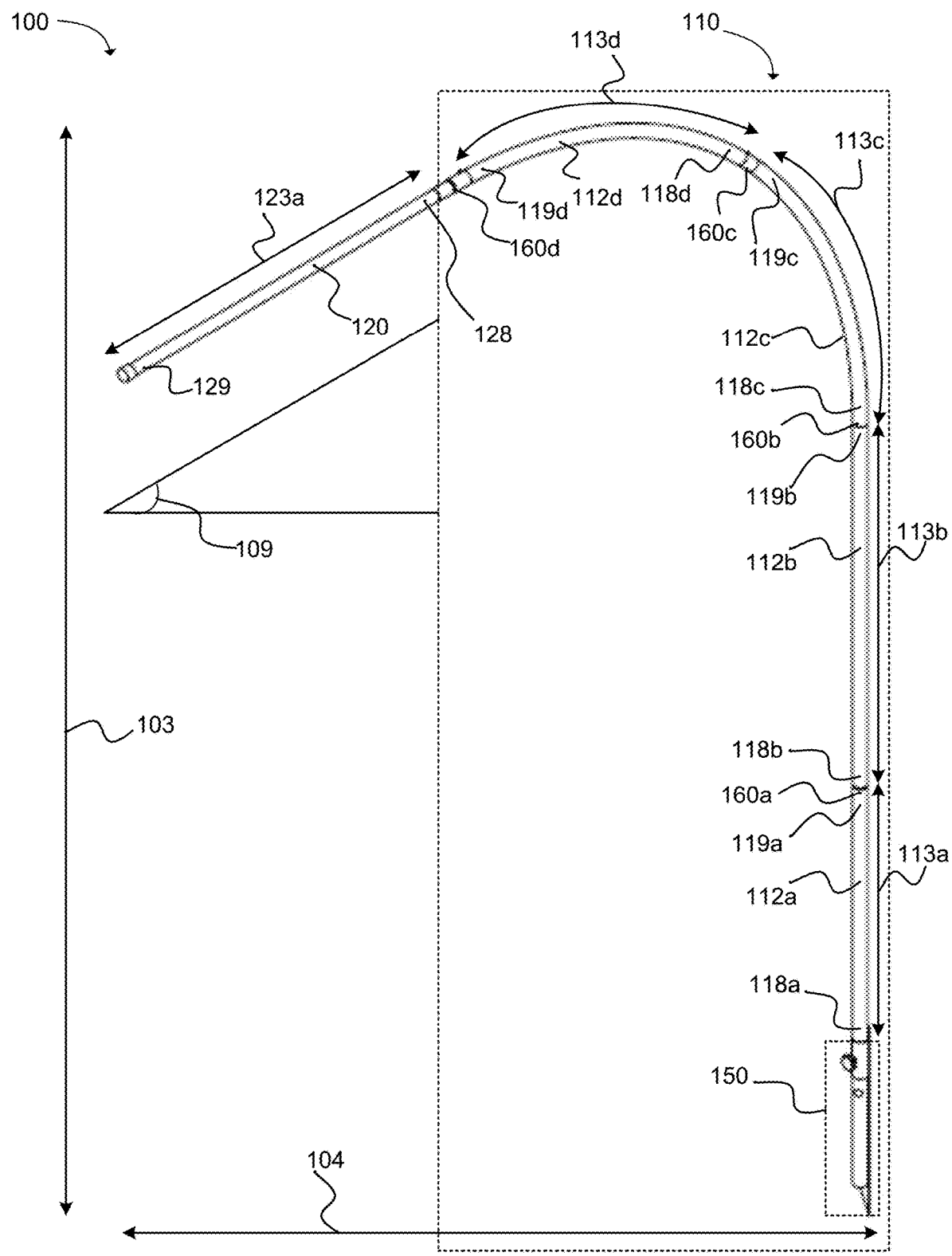
FIG. 1 shows a side view of an outdoor portable light in accordance with an example embodiment.

These drawings are provided to illustrate various aspects of the disclosure and are not intended to be limiting of the scope in terms of dimensions, materials, configurations, arrangements or proportions unless otherwise limited by the claims.

DETAILED DESCRIPTION

While these exemplary embodiments are described in sufficient detail to enable those skilled in the art to practice the disclosure, it should be understood that other embodiments may be realized and that various changes to the disclosure may be made without departing from the spirit and scope of the present disclosure. Thus, the following more detailed description of the embodiments of the present disclosure is not intended to limit the scope of the disclosure, as claimed, but is presented for purposes of illustration and not limitation to describe the features and characteristics of the present disclosure, to set forth the best mode of operation of the disclosure, and to sufficiently enable one skilled in the art to practice the disclosure. Accordingly, the scope of the present disclosure is to be defined solely by the appended claims.

Definitions

In describing and claiming the present disclosure, the following terminology will be used in accordance with the definitions set forth below.

The singular forms "a," "an," and, "the" in the written description include express support for plural referents unless the context clearly dictates otherwise.

In this disclosure, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the composition's nature or characteristics would be permissible if present under the "consisting essentially of" language, even though not expressly recited in a list of items following such terminology. When using an open-ended term, like "comprising" or "including," in the written description it is understood that direct support should also be afforded to "consisting essentially of" language as well as "consisting of" language and other closed, limiting, or exclusive language such as "solely," "exclusively," "singular" and the like as if stated explicitly and vice versa.

The terms "first," "second," "third," "fourth," and the like in the written description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the order in which such steps may be performed, and certain of the stated steps may possibly be omitted and/or certain other steps not described herein may possibly be added to the method.

The terms "left," "right," "front," "back," "top," "bottom," "over," "under," and the like in the written description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein.

Occurrences of the phrase "in one embodiment," or "in one aspect," or "in an example" herein do not necessarily all refer to the same embodiment, aspect, or example. Reference throughout this specification to "an embodiment," or "an aspect," or "an example" means that a particular feature, structure, or characteristic described in connection with the embodiment, aspect, or example is included in at least one embodiment of the present disclosure.

Reference in the written description may be made to devices, structures, systems, or methods that provide "improved" performance. It is to be understood that unless otherwise stated, such "improvement" is a measure of a benefit obtained based on a comparison to devices, structures, systems, or methods in the prior art. Furthermore, it is to be understood that the degree of improved performance may vary between disclosed embodiments and that no equality or consistency in the amount, degree, or realization of improved performance is to be assumed as universally applicable.

As used herein, the term "about" is used to provide flexibility to a numerical range endpoint by providing that a given value may be "a little above" or "a little below" the endpoint. However, it is to be understood that even when the term "about" is used in the present specification in connection with a specific numerical value, that support for the exact numerical value recited apart from the "about" terminology is also provided.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof. As used in this written description, express support for items or actions used with the term "substantially" is also afforded to the item or action without the term "substantially." For example, the terms "substantially closed" also provides express support for the term "closed."

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

As used herein, comparative terms such as "increased," "decreased," "better," "worse," "higher," "lower," "enhanced," and the like refer to a property of a device, component, or activity that is measurably different from other devices, components, or activities in a surrounding or adjacent area, in a single device or in multiple comparable devices, in a group or class, in multiple groups or classes, or as compared to the known state of the art. For example, composition or system that has or provides "increased" stability exhibits a higher degree of stability as compared to a different, yet comparable composition or system, or as compared to a composition or system known in the art. A number of factors can cause such increased stability, including composition ingredients, system components or structures, operation, etc.

As used herein, the term "outdoor" when used in connection with a portable light or light fixture, components thereof, etc. refers to a device, parts, or equipment which is configured primarily for safe and continuous/frequent use in an outdoor environment. Outdoor environments include differing weather circumstances, including extreme weather condition (e.g. extreme heat, moisture from rain or snow, extreme cold, wind, humidity, etc.). By contrast, lighting devices meant primarily for indoor use may have features or properties (such as exposed bulbs, non-sealed electric circuits, etc.) which may be problematic or otherwise prevent sustained use in certain weather conditions or environments, such as those listed above.

The terms "coupled," or "connected" or like words as used herein, are defined as directly or indirectly connected in a mechanical or nonmechanical manner. "Directly coupled" objects or structures are in physical contact and are attached. Objects described herein as being "adjacent to" each other may be in physical contact with each other, in close proximity to each other, or in the same general region or area as each other, as appropriate for the context in which the phrase is used. In this written description, recitation of "coupled" or "connected" or variations of their respective root words, such as "coupling" or "connection" or "connecting," provides express support for "directly coupled" or "directly connected" and variations of their respective root words and vice versa.

Numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually. This same principle applies to ranges reciting only one numerical value as a minimum or a maximum. Furthermore, such an interpretation should apply regardless of the breadth of the range or the characteristics being described.

DESCRIPTION OF EMBODIMENTS

An initial overview of technology embodiments is provided below and specific technology embodiments are then described in further detail. This initial summary is intended to aid readers in understanding the technology more quickly but is not intended to identify key or essential features of the technology, nor is it intended to limit the scope of the claimed subject matter. Unless defined otherwise, all technical and scientific terms used herein have the same meaning as commonly understood by one of ordinary skill in the art to which this disclosure belongs.

Outdoor lighting can be used in a wide array of settings including outdoor sporting events, landscaping, city infrastructure, security, and decoration. For example, an outdoor sporting event, such as basketball, football, skiing, or baseball can use a large amount of light over a large physical area during evening or later. Landscaping can use various kinds of outdoor lights to enrich the ambiance of a garden or backyard during the evening. When camping, an outdoor light can be used for setting up a tent, cooking food, or fishing during sundown. Outdoor lights can also be used as streetlights or security lights in a city setting.

In many cases, outdoor lighting can: (i) use a large amount of voltage, (ii) be difficult to install, uninstall, move, or reconfigure/reposition, (iii) use a stable foundation or permanent anchoring system, (iv) be difficult to store, (v) be heavy and bulky, (vi) be difficult to customize for a particular use, (vii) fail to adequate illuminate a particular area, (viii) be difficult to stabilize in an upright position, and (ix) be expensive.

Based on the foregoing, an outdoor light that can: (i) operate on low power, (ii) be easy to assemble, disassemble, move, or reposition, (iii) be positioned in an upright orientation without a stable or permanent anchoring system, (iv) be stowable, (v) be compact and lightweight, (vi) be adapted for different settings, (vii) illuminate a large area with a large amount of light, (viii) remain stable in harsh weather, and (ix) be inexpensive relative to permanent lighting arrangements would be useful.

In one embodiment, an outdoor portable light can comprise a frame including a frame segment having a frame segment length and cross-sectional area, and a light segment having a light segment length and cross-sectional area that is substantially equal to the frame segment length and cross-sectional area. In one aspect, the light segment can comprise a light source housing holding a light source strip, and an outer housing.

In another embodiment, a method is provided for stabilizing an outdoor portable light. In one aspect, the method can comprise selecting a weight ratio between a frame and a light segment of greater than 3:2. In another aspect, the method can comprise matching a length and cross-sectional area of the light segment to a length and cross-sectional area of a frame segment of the frame. In another aspect, the method can comprise selecting a Young's modulus for the frame segment to stabilize the outdoor portable light in an upright orientation.

In another embodiment, a method for facilitating assembly and disassembly of an outdoor portable light is provided. In one aspect, the method can comprise matching a length and cross-sectional area of a light segment to a length and cross-sectional area of a frame segment of a frame. In another aspect, the method can comprise selecting a total curvature for an arcuate frame segment of the frame of less than about 10°. In another aspect, the method can comprise anchoring a reversible frame segment anchor to a fixed structure.

In one embodiment, as illustrated in FIG. 1, an outdoor portable light 100 can be used to illuminate a physical proximity. The area of the physical proximity can vary based on the use case (e.g., sports, camping, landscaping, and the like).

In one aspect, the outdoor portable light 100 can comprise a frame 110 including a frame segment 112a, 112b, 112c, 112d having a frame segment length 113a, 113b, 113c, 113d and cross-sectional area. The frame 110 of the outdoor portable light 100 can comprise any suitable number of frame segments 112a, 112b, 112c, 112d. In one example, the number of frame segments 112a, 112b, 112c, 112d can range from 1 to about 100. As illustrated in FIG. 1, the number of frame segments 112a, 112b, 112c, 112d can be 4. The number of frame segments can be adjusted to select a total height and total width for the outdoor portable light 100 and customize the outdoor portable light 100 for the particular use case.

In one aspect, the frame segment length 113a, 113b, 113c, 113d can be any suitable length that can be stowable, compact, and lightweight. In one example, the frame segment length 113a, 113b, 113c, 113d can be from about 50 cm to about 200 cm.

In one example, the frame segment length 113a, 113b, 113c, 113d can be from about 112 cm to about 117 cm. In another example, the frame segment length 113a, 113b, 113c, 113d can be from about 75 cm to about 80 cm. In yet another example, the frame segment length 113a, 113b, 113c, 113d can be from about 151 cm to about 158 cm.

In another aspect, the frame segment 112a, 112b, 112c, 112d cross-sectional area can be any suitable area that can be stowable, compact, and lightweight while maintaining adequate stability. In one example, the frame segment 112a, 112b, 112c, 112d cross-sectional area can be from about 90 $mm^2$ to about 10,000 $mm^2$. In another example, the frame segment 112a, 112b, 112c, 112d cross-sectional area can be from about 200 $mm^2$ to about 3,000 $mm^2$. In yet another example, the frame segment 112a, 112b, 112c, 112d cross-sectional area can be from about 500 $mm^2$ to about 1,200 $mm^2$. In yet another example, the frame segment 112a, 112b, 112c, 112d cross-sectional area can be from about 650 $mm^2$ to about 950 $mm^2$.

In one aspect, the frame segment 112a, 112b, 112c, 112d can comprise any suitable material that can allow for an adequate amount of strength, elasticity, and weight. In one example, the material can comprise one or more of: aluminum, steel, polymers, carbon fiber, the like, or a combination thereof. In one example, the material can comprise aluminum 6063, Nylon plastic, rubber, the like, or a combination thereof. In another aspect, the frame segment 112a, 112b, 112c, 112d can be solid, hollow, a mixture of solid and hollow, the like, or a combination thereof.

In another aspect, the outdoor portable light 100 can comprise a light segment 120 having a light segment length 123a and cross-sectional area that is substantially equal to the frame segment length 113a, 113b, 113c, 113d and cross-sectional area.

In one aspect, the light segment length 123a can be any suitable length that can be stowable, compact, and lightweight. In one example, the light segment length 123a can be from about 50 cm to about 200 cm. In one example, the light segment length 123a can be from about 100 cm to about 113 cm. In another example, the light segment length 123a can be from about 67 cm to about 76 cm. In yet another example, the light segment length 123a can be from about 135 cm to about 153 cm.

In another aspect, the light segment 120 cross-sectional area can be any suitable area that can be stowable, compact, and lightweight while maintaining adequate stability.

In one example, the light segment 120 cross-sectional area can be from about 90 $mm^2$ to about 10,000 $mm^2$. In another example, the light segment 120 cross-sectional area can be from about 200 $mm^2$ to about 3,000 $mm^2$. In yet another example, the light segment 120 cross-sectional area can be from about 500 $mm^2$ to about 1,200 $mm^2$. In yet another example, the light segment 120 cross-sectional area can be from about 650 $mm^2$ to about 950 $mm^2$.

Figure 3A:
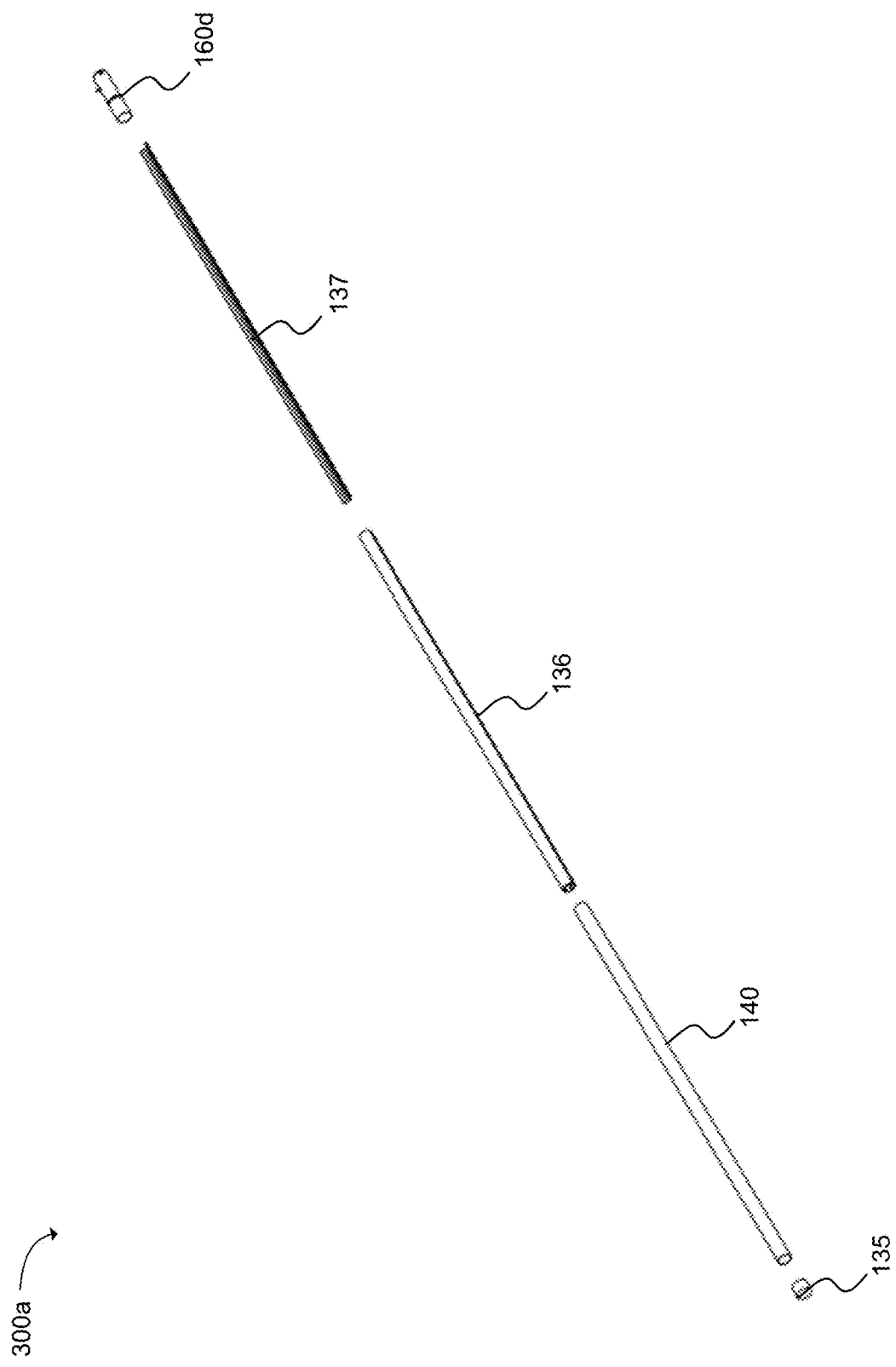
FIG. 3A shows an exploded perspective view of a light segment in accordance with an example embodiment.
Figure 3B:
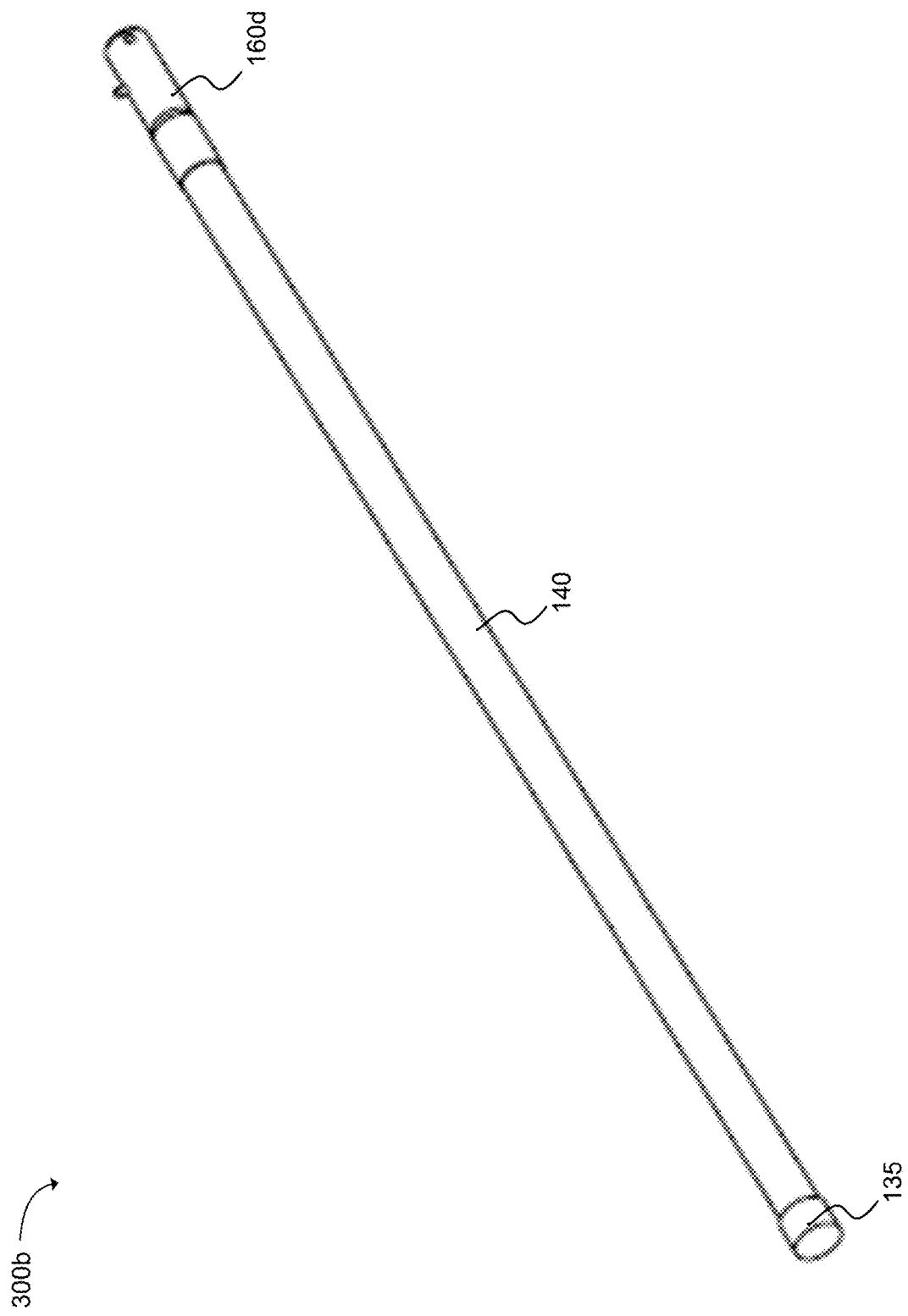
FIG. 3B shows a perspective view of a light segment in accordance with an example embodiment.
Figure 3C:
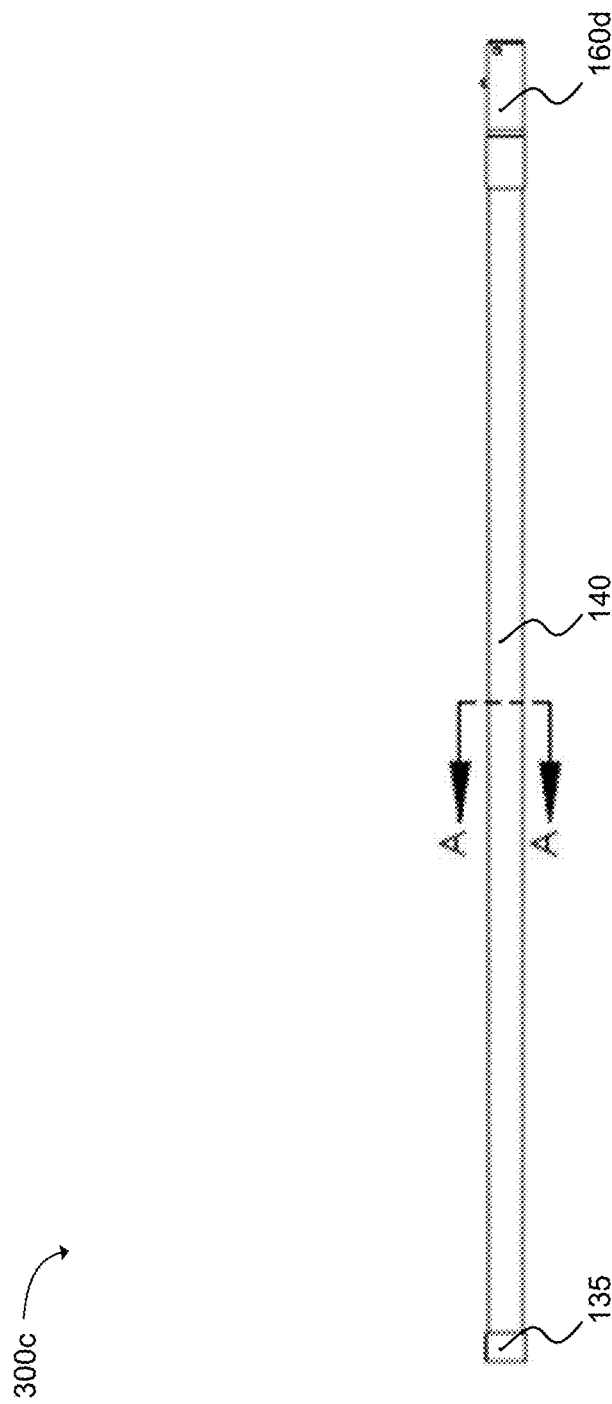
FIG. 3C shows a side view of a light segment in accordance with an example embodiment.
Figure 3D:
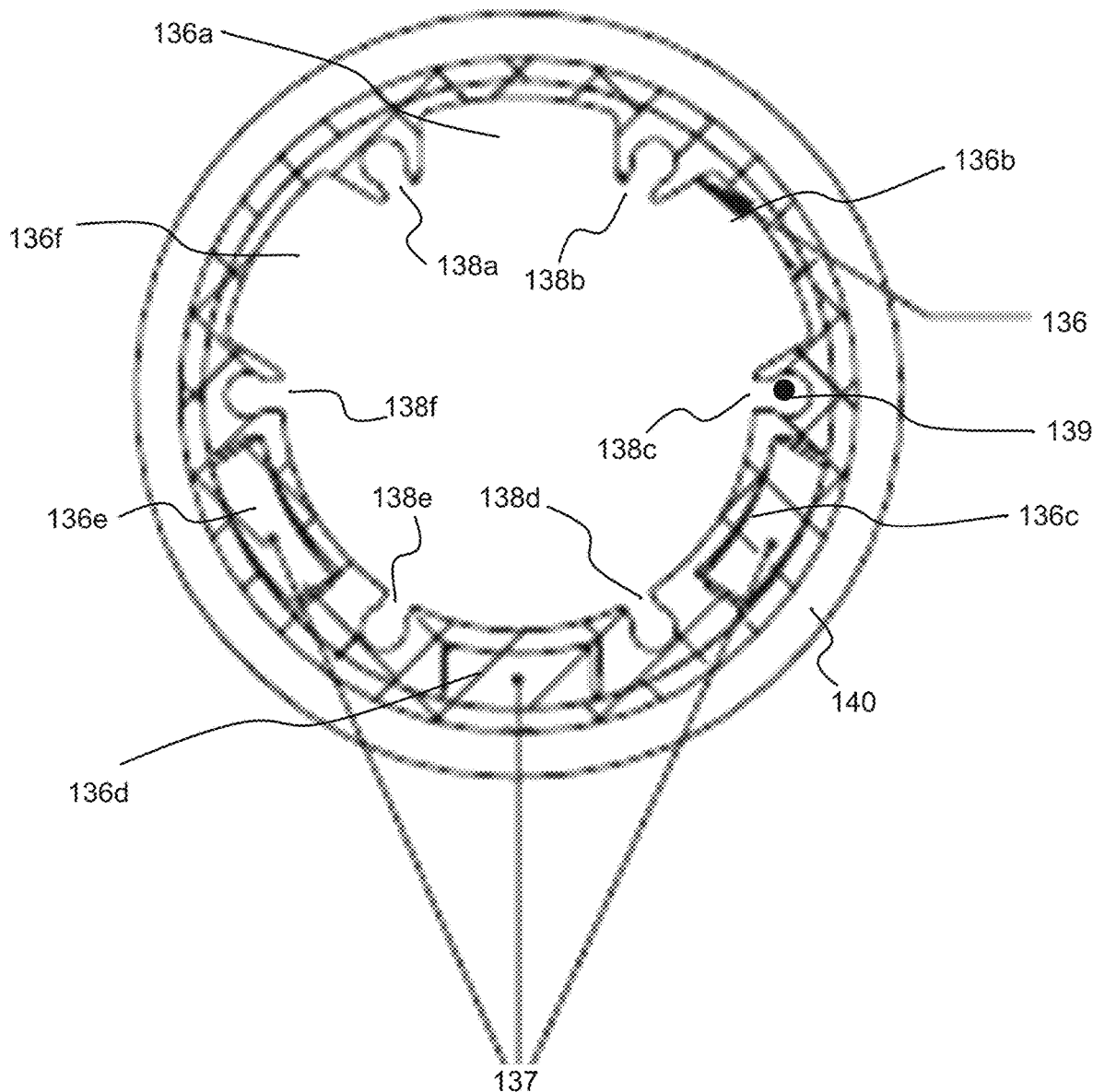
FIG. 3D shows a cross-sectional view of a light segment in accordance with an example embodiment.

In another aspect, the light segment 120 can comprise: a light source housing 136, holding a light source strip 137, and an outer housing 140, as illustrated in FIG. 3D. In one aspect, the light source housing can comprise one or more light source recesses 136a, 136b, 136c, 136d, 136e, 136f can be sized and shaped to hold one or more light source strips 137. In one example, the one or more light source recesses 136a, 136b, 136c, 136d, 136e, 136f can have a cross-sectional area of from about 5 $mm^2$ to about 100 $mm^2$. In another example, the one or more light source recesses 136a, 136b, 136c, 136d, 136e, 136f can have a length of from about 100 mm to about 1100 mm.

In one aspect, the one or more light source recesses 136a, 136b, 136c, 136d, 136e, 136f can have any suitable cross-sectional shape having any combination of. (a) straight line segments, or (b) curved line segments comprising or not comprising circular arcs. In one example, the cross-sectional shape can be any suitable polygon including one or more of: a triangle, a quadrilateral, a pentagon, a hexagon, a heptagon, an octagon, a nonagon, a decagon, a hendecagon, a dodecagon, a shape having from about 13 to about 1000 sides, the like, or a combination thereof. In another example, the cross-sectional shape can comprise a circular arc and be one or more of: an annulus, an arbelos, a circle, a circular sector, a circular segment, a crescent, a lens, a lune, a quatrefoil, a reuleaux polygon, a salinon, a semicircle, a tomahawk, a trefoil, triquetra, a heart, the like, or a combination thereof. In another example, the cross-sectional shape can comprise a curve that is not a circular arc including one or more of: an Archimedean spiral, an astroid, a cardioid, a deltoid, an ellipse, a lemniscate, an oval, an ovoid, a superellipse, a taijitu, a tomoe, a magatama, the like, or a combination thereof.

In another aspect, the light segment 120 can comprise any suitable number of light source recesses 136a, 136b, 136c, 136d, 136e, 136f. In one example, the number of light source recesses 136a, 136b, 136c, 136d, 136e, 136f can be from 1 to 3. In another example, the number of light source recesses 136a, 136b, 136c, 136d, 136e, 136f can be from 1 to 8. In another example, the number of light source recesses 136*a*, 136*b*, 136*c*, 136*d*, 136*e*, 136*f* can be from 1 to 36.

In one aspect, the light source strip 137 can be any suitable type of LED including one or more of: a mini-LED, an application-specific LED, a high-power LED, an alpha-numeric LED, a lighting LED, a red green blue (RGB) LED, a flashing LED, a bi-color or tri-color LED, the like, or a combination thereof.

In another aspect, the light source strip 137 can be an RGB LED strip. When the light source strip 137 is an RGB LED strip, the RBG LED strip can be operable to emit red, green, or blue, or a combination thereof. In one example, the RGB LED strip can be operable to emit an amber color to prevent the gathering of insects near the light source strip 137.

In another aspect, the light segment 120 can comprise any suitable number of light source strips 137. In one example, the number of light source strips 137 can be from 1 to 3. In another example, the number of light source strips 137 can be from 1 to 8. In another example, the number of light source strips 137 can be from 1 to 36.

Figure 12:
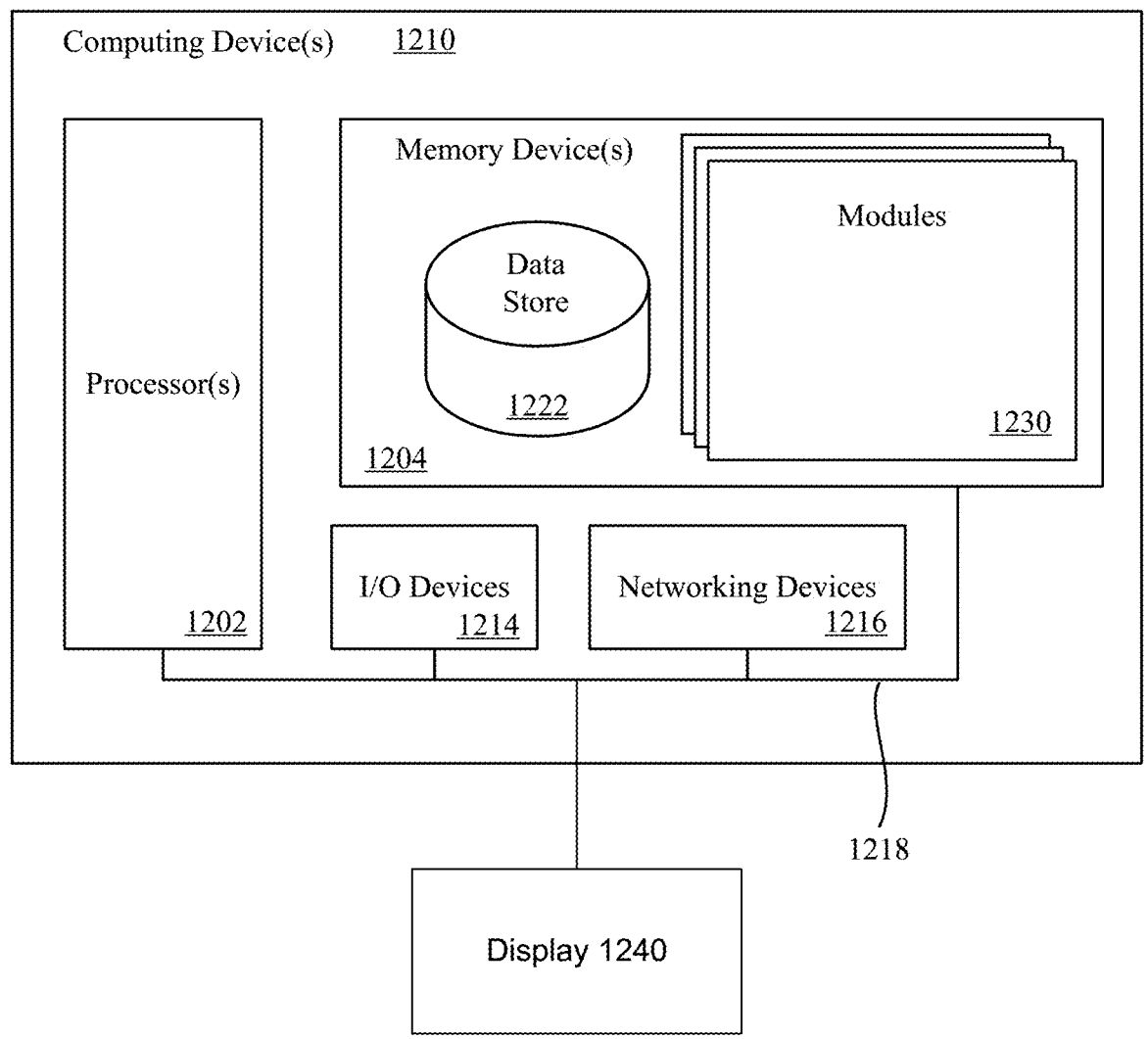
FIG. 12 shows a computing device in accordance with an example embodiment.

In another example, the outdoor portable light 100 can comprise a controller or processor 1202 (as illustrated in FIG. 12) operable to: adjust an emitted color to a different emitted color; adjust a brightness level, adjust a color changing mode (e.g., strobe, fading, flash, order, speed, or the like).

In another aspect, the light segment 120 can be operable to irradiate from about 10 lumens to about 15,000 lumens. In one example, the light segment 120 can be operable to irradiate from about 1,000 lumens to about 10,000 lumens. In another example, the light segment 120 can be operable to irradiate from about 5,000 lumens to about 7,500 lumens. In another example, the light segment 120 can be operable to irradiate from about 6,000 lumens to about 6,500 lumens. In another example, the light segment can be operable to emit about 6,300 lumens.

In one aspect, the outer housing 140 can comprise any suitable material that can allow for an adequate amount of strength, elasticity, weight, and transparency. In one example, the material can comprise one or more of: aluminum, polymer, acrylic, glass, silicon, the like, or a combination thereof. In one example, the material can comprise aluminum 6063, polycarbonate, the like, or a combination thereof. In another aspect, the outer housing 140 can be solid, hollow, a mixture of solid and hollow, the like, or a combination thereof. In one example, the outer housing 140 can be transparent or semi-transparent.

In one aspect, the light source housing 136 can comprise any suitable material that can allow for an adequate amount of strength, elasticity, and weight. In one example, the material can comprise one or more of: aluminum, steel, the like, or a combination thereof. In one example, the material can comprise aluminum 6063, polymer, the like, or a combination thereof. In another aspect, the light source housing 136 can be solid, hollow, a mixture of solid and hollow, the like, or a combination thereof.

In another aspect, the frame segment 112*a*, 112*b*, 112*c*, 112*d* can comprise a straight frame segment 112*a*, 112*b* or an arcuate frame segment 112*c*, 112*d*. The number of straight frame segments 112*a*, 112*b* and the number of arcuate frame segments 112*c*, 112*d* can vary based on a desired shape for the frame 110.

In one aspect, the frame segment 112*a*, 112*b*, 112*c*, 112*d* can comprise a straight frame segment 112*a*, 112*b*. In one example, the straight frame segment 112*a*, 112*b* can have a total curvature from a first end 118*a*, 118*b* to a second end 119*a*, 119*b*, respectively, of less than one or more of about 10°, about 5°, about 2°, about 1°, the like, or a combination thereof. As used herein, the "total curvature" is the integral of curvature along a curve taken with respect to arc length in which the "arc length" can be defined as distance between two points along a section of a curve.

In another aspect, the frame segment 112*a*, 112*b*, 112*c*, 112*d* can comprise an arcuate frame segment 112*c*, 112*d*. In one example, the arcuate frame segment 112*c*, 112*d* can have a total curvature from a first end 118*c*, 118*d* to a second end 119*c*, 119*d* of from about 100 to about 180°. In another example, the arcuate frame segment 112*c*, 112*d* can have a total curvature from a first end 118*c*, 118*d* to a second end 119*c*, 119*d* of from about 100 to about 90°. In another example, the arcuate frame segment 112*c*, 112*d* can have a total curvature from a first end 118*c*, 118*d* to a second end 119*c*, 119*d* of from about 100 to about 60°. In another example, the arcuate frame segment 112*c*, 112*d* can have a total curvature from a first end 118*c*, 118*d* to a second end 119*c*, 119*d* of from about 100 to about 30°. In another example, the arcuate frame segment 112*c*, 112*d* can have a total curvature from a first end 118*c*, 118*d* to a second end 119*c*, 119*d* of from about 200 to about 30°. In another example, the arcuate frame segment 112*c*, 112*d* can have a total curvature from a first end 118*c*, 118*d* to a second end 119*c*, 119*d* of from about 100 to about 20°.

In another example, the light segment 120 can be a straight light segment or an arcuate light segment. When the light segment 120 is a straight light segment, the total curvature of the straight light segment can be less than one or more of about 10°, about 5°, about 2°, about 1°, the like, or a combination thereof from a first end 128 to a second end 129 of the light segment 120. When the light segment 120 is an arcuate light segment, the total curvature of the arcuate light segment can be from about 100 to about 1800 from a first end 128 to a second end 129 of the light segment 120.

In one example, the frame segment can be a straight frame segment 112*a*, 112*b* that is coupled to a second frame segment that is an arcuate frame segment 112*c*, 112*d*. In another aspect, the second frame segment 112*c*, 112*d* can be coupled to the light segment 120.

In another example, the frame segment can be a first straight frame segment 112*a*, that is coupled to a second frame segment 112*b* that is a second straight frame segment. In another aspect, a third frame segment 112*c* can be a first arcuate frame segment that is coupled to the second frame segment 112*b* and a fourth frame segment 112*d* that is a second arcuate frame segment. In another aspect, the fourth frame segment 112*d* can be coupled to the light segment 120.

In another aspect, the frame 110 can comprise an additional frame segment 112*a*, 112*b*, 112*c*, 112*d* having an additional frame segment length 113*a*, 113*b*, 113*c*, 113*d* and cross-sectional area that is substantially equal to the frame segment length 113*a*, 113*b*, 113*c*, 113*d* and cross-sectional area. In another aspect, an additional light segment can be operable to be coupled between the light segment 120 and the frame segment 112*a*, 112*b*, 112*c*, or 112*d*. In one aspect, the additional light segment can have a length and cross section that is substantially equal to the light segment length 123*a* and cross-sectional area.

In one example, the additional frame segment length 113*a*, 113*b*, 113*c*, 113*d* and the frame segment length 113*a*, 113*b*, 113*c*, 113*d* can be substantially equal when the additional frame segment length 113*a*, 113*b*, 113*c*, 113*d* to frame segment length 113*a*, 113*b*, 113*c*, 113*d* ratio is from about 3:2 to about 2:3. In another example, the additional frame segment length 113a, 113b, 113c, 113d and the frame segment length 113a, 113b, 113c, 113d can be substantially equal when the additional frame segment length 113a, 113b, 113c, 113d to frame segment length 113a, 113b, 113c, 113d ratio is from about 10:9 to about 9:10. In another example, the additional frame segment length 113a, 113b, 113c, 113d and the frame segment length 113a, 113b, 113c, 113d can be substantially equal when the additional frame segment length 113a, 113b, 113c, 113d to frame segment length 113a, 113b, 113c, 113d ratio is from about 20:19 to about 19:20.

In another example, the additional frame segment 112a, 112b, 112c, 112d cross-sectional area and the frame segment 112a, 112b, 112c, 112d cross-sectional area can be substantially equal when the additional frame segment 112a, 112b, 112c, 112d cross-sectional area to frame segment 112a, 112b, 112c, 112d cross-sectional area ratio is from about 3:1 to about 1:3. In another example, the additional frame segment 112a, 112b, 112c, 112d cross-sectional area and the frame segment 112a, 112b, 112c, 112d cross-sectional area can be substantially equal when the additional frame segment 112a, 112b, 112c, 112d cross-sectional area to frame segment 112a, 112b, 112c, 112d cross-sectional area ratio is from about 3:2 to about 2:3. In another example, the additional frame segment 112a, 112b, 112c, 112d cross-sectional area and the frame segment 112a, 112b, 112c, 112d cross-sectional area can be substantially equal when the additional frame segment 112a, 112b, 112c, 112d cross-sectional area to frame segment 112a, 112b, 112c, 112d cross-sectional area ratio is from about 10:9 to about 9:10.

In one example, the additional light segment length and the light segment length 123a can be substantially equal when the additional light segment length to light segment length 123a ratio is from about 3:2 to about 2:3. In another example the additional light segment length and the light segment length 123a can be substantially equal when the additional light segment length to light segment length 123a ratio is from about 10:9 to about 9:10. In another example, the additional light segment length and the light segment length 123a can be substantially equal when the additional light segment length to light segment length 123a ratio is from about 20:19 to about 19:20.

In another example, the additional light segment cross-sectional area and the light segment cross-sectional area can be substantially equal when the additional light segment cross-sectional area to the light segment cross-sectional area ratio is from about 3:1 to about 1:3. In another example, the additional light segment cross-sectional area and the light segment cross-sectional area can be substantially equal when the additional light segment cross-sectional area to the light segment cross-sectional area ratio is from about 3:2 to about 2:3. In another example, the additional light segment cross-sectional area and the light segment cross-sectional area can be substantially equal when the additional light segment cross-sectional area to the light segment cross-sectional area ratio is from about 10:9 to about 9:10.

In another aspect, the outdoor portable light 100 can have a weight ratio between a light segment 120 weight and a frame segment 112a, 112b, 112c, or 112d weight that can be from about 5:1 to about 1:5. In one example, the outdoor portable light 100 can have a weight ratio between a light segment 120 weight and a frame segment 112a, 112b, 112c, or 112d weight that can be from about 3:1 to about 1:1. In another example, the outdoor portable light 100 can have a weight ratio between a light segment 120 weight and a frame segment 112a, 112b, 112c, or 112d weight that can be from about 2.5:1 to about 1.5:1. In another example, the outdoor portable light 100 can have a weight ratio between a light segment 120 weight and a frame segment 112a, 112b, 112c, or 112d weight that can be about 2:1.

In one aspect, a weight of the light segment 120 can be less than one or more of about 5 pounds, about 3.5 pounds, about 2.5 pounds, about 1.5 pounds, the like, or a combination thereof. In another aspect, a weight of the frame segment 112a, 112b, 112c, or 112d can be less than one or more of about 5 pounds, about 3.5 pounds, about 2.5 pounds, about 1.5 pounds, the like, or a combination thereof.

In another aspect, the light segment length 123a and the frame segment length 113a, 113b, 113c, 113d can be substantially equal when a light segment length 123a to frame segment length 113a, 113b, 113c, 113d ratio is from about 3:2 to about 2:3. In one example, the light segment length 123a and the frame segment length 113a, 113b, 113c, 113d can be substantially equal when the light segment length 123a to frame segment length 113a, 113b, 113c, 113d ratio is from about 10:9 to about 9:10.

In another example, the light segment 120 cross-sectional area and the frame segment 112a, 112b, 112c, 112d cross-sectional area can be substantially equal when the light segment 120 cross-sectional area to frame segment 112a, 112b, 112c, 112d cross-sectional area ratio is from about 3:1 to about 1:3. In another example, the light segment 120 cross-sectional area and the frame segment 112a, 112b, 112c, 112d cross-sectional area can be substantially equal when the light segment 120 cross-sectional area to frame segment 112a, 112b, 112c, 112d cross-sectional area ratio is from about 3:2 to about 2:3. In another example, the light segment 120 cross-sectional area and the frame segment 112a, 112b, 112c, 112d cross-sectional area can be substantially equal when the light segment 120 cross-sectional area to frame segment 112a, 112b, 112c, 112d cross-sectional area ratio is from about 10:9 to about 9:10.

In one aspect, a frame segment 112a, 112b, 112c, or 112d thickness or a light segment 120 thickness can be from about 0.12 mm to about 8.2 mm. In one example, the frame segment 112a, 112b, 112c, or 112d thickness or a light segment 120 thickness can be from about 0.31 mm to about 3.2 mm. In another example, the frame segment 112a, 112b, 112c, or 112d thickness or a light segment 120 thickness can be from about 0.8 mm to about 1.2 mm.

In another aspect, a frame segment 112a, 112b, 112c, or 112d circumference or a light segment 120 circumference can be from about 40 mm to about 160 mm. In one example, the frame segment 112a, 112b, 112c, or 112d circumference or the light segment 120 circumference can be from about 80 mm to about 120 mm. In another example, the frame segment 112a, 112b, 112c, or 112d circumference or the light segment 120 circumference can be from about 95 mm to about 105 mm.

In one aspect, a total height 103 to total width 104 ratio between the total height 103 of the outdoor portable light 100 and the total width 104 of the outdoor portable light 100 can be from about 10:1 to about 1:1. In one example, the total height 103 to total width 104 ratio between the total height 103 of the outdoor portable light 100 and the total width 104 of the outdoor portable light 100 can be from about 5:1 to about 2:1. In another example, the total height 103 to total width 104 ratio between the total height 103 of the outdoor portable light 100 and the total width 104 of the outdoor portable light 100 can be from about 3:1 to about 3:2.

In another aspect, a total weight of the outdoor portable light 100 can be less than one or more of about 20 pounds, 18 pounds, 16 pounds, 15 pounds, 14 pounds, 12.5 pounds, 12 pounds, 10 pounds, or about 8 pounds, or about 5 pounds, about 4.5 pounds, the like, or a combination thereof. In another example, a total vertical height of the outdoor portable light 100 can be any suitable height between about 1 foot and about 20 feet. In one example, a total vertical height of the outdoor portable light 100 can be about 6 feet, about 8 feet, about 10 feet, about 12 feet, or about 14 feet, or about 16 feet, or about 18 feet, or about 20 feet.

In another aspect, one or more of the frame segments 112a, 112b, 112c, or 112d can be configured to hold the light segment 120 at an angle from horizontal 109 of from about 0° to about 90°. In one example, the one or more of the frame segments 112a, 112b, 112c, or 112d can be configured to hold the light segment 120 at an angle from horizontal 109 of from about 0° to about 60°. In another example, the one or more of the frame segments 112a, 112b, 112c, or 112d can be configured to hold the light segment 120 at an angle from horizontal 109 of from about 30° to about 60°. In another example, the one or more of the frame segments 112a, 112b, 112c, or 112d can be configured to hold the light segment 120 at an angle from horizontal 109 of from about 0° to about 30°. The angle from horizontal 109 can be in a downward direction, as illustrated in FIG. 1, or in an upward direction. In one example, the angle from horizontal can be 90° and the light segment can be held in an upward vertical direction or in a downward vertical direction.

In one aspect, the outdoor portable light 100 can be operable to remain upright when subjected to wind pressure or wind speed below a selected threshold. In one example, the outdoor portable light 100 can be upright when the degree of angular displacement from vertical measured at half the total height 103 of the frame 110 is less than one or more of 30°, 20°, 10°, 5°, 2°, 1°, the like, or a combination thereof.

In one aspect, the outdoor portable light 100 can be operable to remain upright when subjected to wind pressure (N/m$^2$) of less than 150 N/m$^2$. In one example, when the wind speed is about 5 mph, the wind pressure can be about 3.0 N/m$^2$. In another example, when the wind speed is about 10 mph, the wind pressure can be about 12.0 N/m$^2$. In another example, when the wind speed is about 20 mph, the wind pressure can be about 48.0 N/m$^2$. In another example, when the wind speed is about 30 mph, the wind pressure can be about 107.9 N/m$^2$. In another example, when the wind speed is about 35 mph, the wind pressure can be about 146.9 N/m$^2$. In another example, when the wind speed is about 40 mph, the wind pressure can be about 191.9 N/m$^2$. In another aspect, the outdoor portable light 100 can be operable to remain upright when subjected to a wind speed of less than one or more of: 40 mph, 35 mph, 30 mph, 20 mph, 10 mph, 5 mph, the like, or a combination thereof.

In another aspect, the outdoor portable light 100 can be operable to remain upright when subjected to a point force (e.g., from wind) at a specific location on the outdoor portable light 100 and from a specific direction. In one example, as illustrated in the force diagram 600c in FIG. 6C, the outdoor portable light 100 can remain upright when subjected to a point force #1 between frame segment 112b and frame segment 112c (e.g., half the distance of the vertical height of the outdoor portable light 100) from a direction that is parallel to the X-Z plane in which the point force can be less than 100 N, 90 N, 80 N, 75 N, 72.5 N, 70 N, 65 N, 50 N, 35 N, 20 N, the like, or a combination thereof.

In another example, the outdoor portable light 100 can remain upright when subjected to a point force #2 between frame segment 112c and frame segment 112d (i.e., the midpoint of the arcuate section of the combination of frame segments 112c and 112d) from a direction that is along the Z-axis in which the point force can be less than 70 N, 65 N, 60 N, 55 N, 52.5 N, 50 N, 47.5 N, 45 N, 40 N, 30 N, 25 N, 20 N, 15 N, the like, or a combination thereof.

In another example, the outdoor portable light 100 can remain upright when subjected to a point force #3 at the distal end of frame segment 112e (i.e., the farthest point away from the base of the outdoor portable light) from a direction that is along the Z-axis in which the point force can be less than 50 N, 45 N, 40 N, 37.5 N, 35 N, 32.5 N, 30 N, 25 N, 20 N, 15 N, 10 N, 5 N, the like, or a combination thereof.

In one aspect, the frame segment 112a, 112b, 112c, or 112d can have a bending moment, shear force, or a combination thereof that is selected to facilitate a threshold amount of stability. In one example, the bending moment, shear force, or a combination thereof for the frame segment can be selected to stabilize the outdoor portable light in an upright orientation.

In one aspect, the frame segment 112a, 112b, 112c, or 112d can have a bending moment of from about 49 N*m to about 81 N*m. In one example, the frame segment 112a, 112b, 112c, or 112d can have a bending moment of from about 87 N*m to about 145 N*m. In another example, the frame segment 112a, 112b, 112c, or 112d can have a bending moment of from about 136 N*m to about 227 N*m.

In one aspect, the frame segment 112a, 112b, 112c, or 112d can have a shear force of from about 8 N*m to about 15 N*m. In one example, the frame segment 112a, 112b, 112c, or 112d can have a shear force of from about 15 N*m to about 26 N*m. In another example, the frame segment 112a, 112b, 112c, or 112d can have a shear force of from about 24 N*m to about 41 N*m.

In one aspect, the frame segment 112a, 112b, 112c, or 112d can have a Young's modulus of from about 30 GPa to about 400 GPa. In one example, the frame segment 112a, 112b, 112c, or 112d can have a Young's modulus of from about 65 GPa to about 75 GPa. In another example, the frame segment 112a, 112b, 112c, or 112d can have a Young's modulus of from about 67 GPa to about 72 GPa.

In one aspect, the outdoor portable light 100 can comprise a reversible frame segment anchor 150 operable to anchor the frame segment 112a to a fixed structure (e.g., the ground, a house, a fence, a basketball hoop, a soccer goal, a tree, a tent, a wall, a vehicle, or the like). In one example, a frame segment anchor can be reversible when the frame segment anchor can be used more than once, twice, five times, 20 times, 100 times, the like, or a combination thereof. In one aspect, the reversible frame segment anchor 150 can comprise one or more of a stake, a spike, a bolt, a screw, a string, a strap, Velcro, clips, snaps, zippers, hooks, loop closures, the like, or a combination thereof.

In another aspect, the frame segment 112a, 112b, 112c, or 112d or the light segment 120 can further comprise a connector 160a, 160b, 160c, 160d configured to couple the frame segment 112a, 112b, 112c, or 112d or light segment 120 to each adjacent frame segment 112a, 112b, 112c, or 112d or light segment 120. In one example, the connector 160a, 160b, 160c, 160d can comprise one or more of Y-shaped connector, a T-shaped connector, a 3-pronged connector, a cable, a single pin socket, the like, or a combination thereof.

Figure 8A:
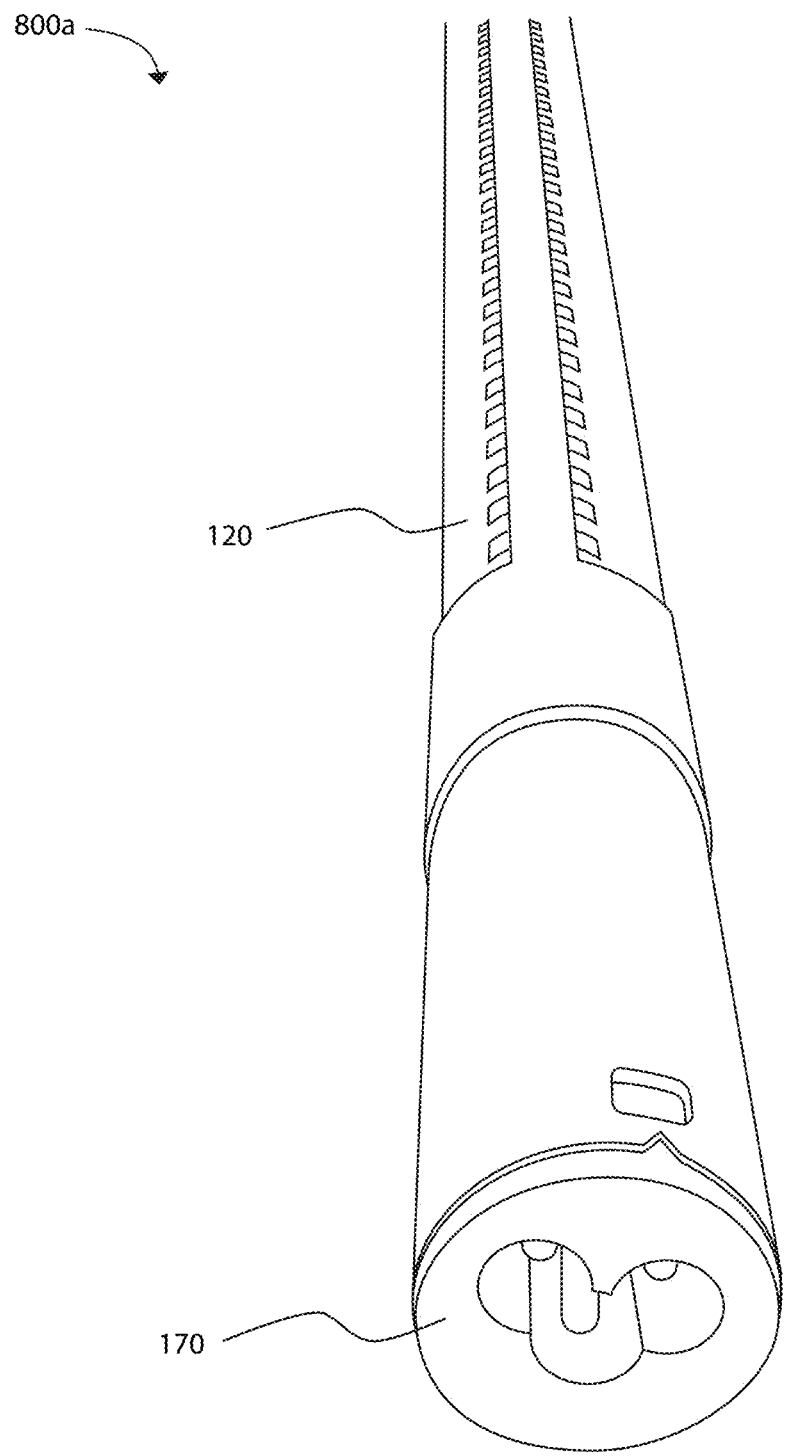
FIG. 8A shows a socket of a light segment of an outdoor portable light in accordance with an example embodiment.
Figure 11:
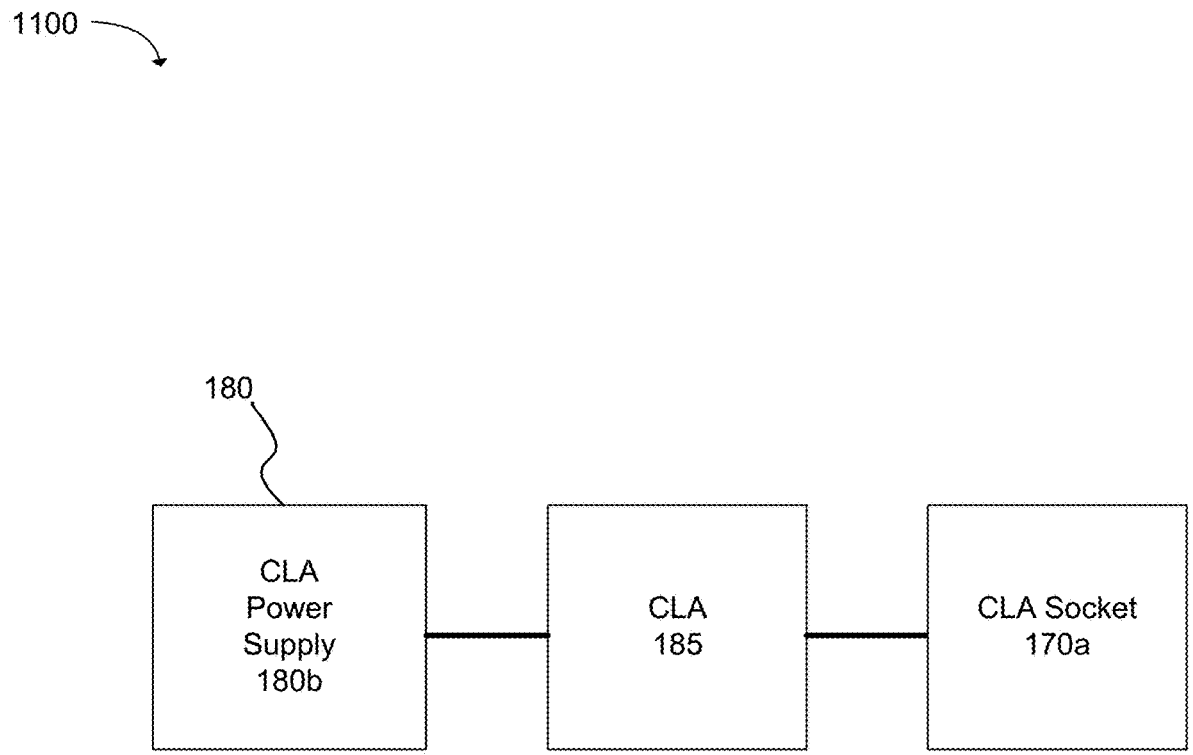
FIG. 11 shows a cigarette light adaptor (CLA) power supply coupled to a CLA in accordance with an example embodiment.

In another aspect, the light segment 120 can further comprise a socket 170 (as illustrated in FIG. 8A) operable to be coupled to a power source 180 (as illustrated in FIG. 11). In another aspect, the light segment 120 can comprise a wire recess 138a, 138b, 138c, 138d, 138e, 138f holding a wire (e.g., 139) coupled between the light source strip 137 and a power source, as illustrated in FIG. 3D. In one aspect, the light segment 120 can be operable to be positioned adjacent the frame segment 112a, 112b, 112c, or 112d without removing wiring 139 between the light segment 120 and the frame segment 112a, 112b, 112c, or 112d.

In one aspect, the light segment 120 can be operable to receive power from a portable power source 180, as illustrated in FIG. 11. In another aspect, the power source 180 can provide a voltage of from about 1 V to about 120 V. In one example, the power source 180 can provide a voltage of from about 6 V to about 36 V. In another example, the power source 180 can provide a voltage of from about 18 V to about 30 V. In another example, the power source 180 can provide a wattage of from about 1 W to about 300 W. In another example, the power source 180 can provide a wattage of from about 24 W to about 120 W. In another example, the power source 180 can provide a wattage of from about 45 W to about 75 W.

Figure 9:
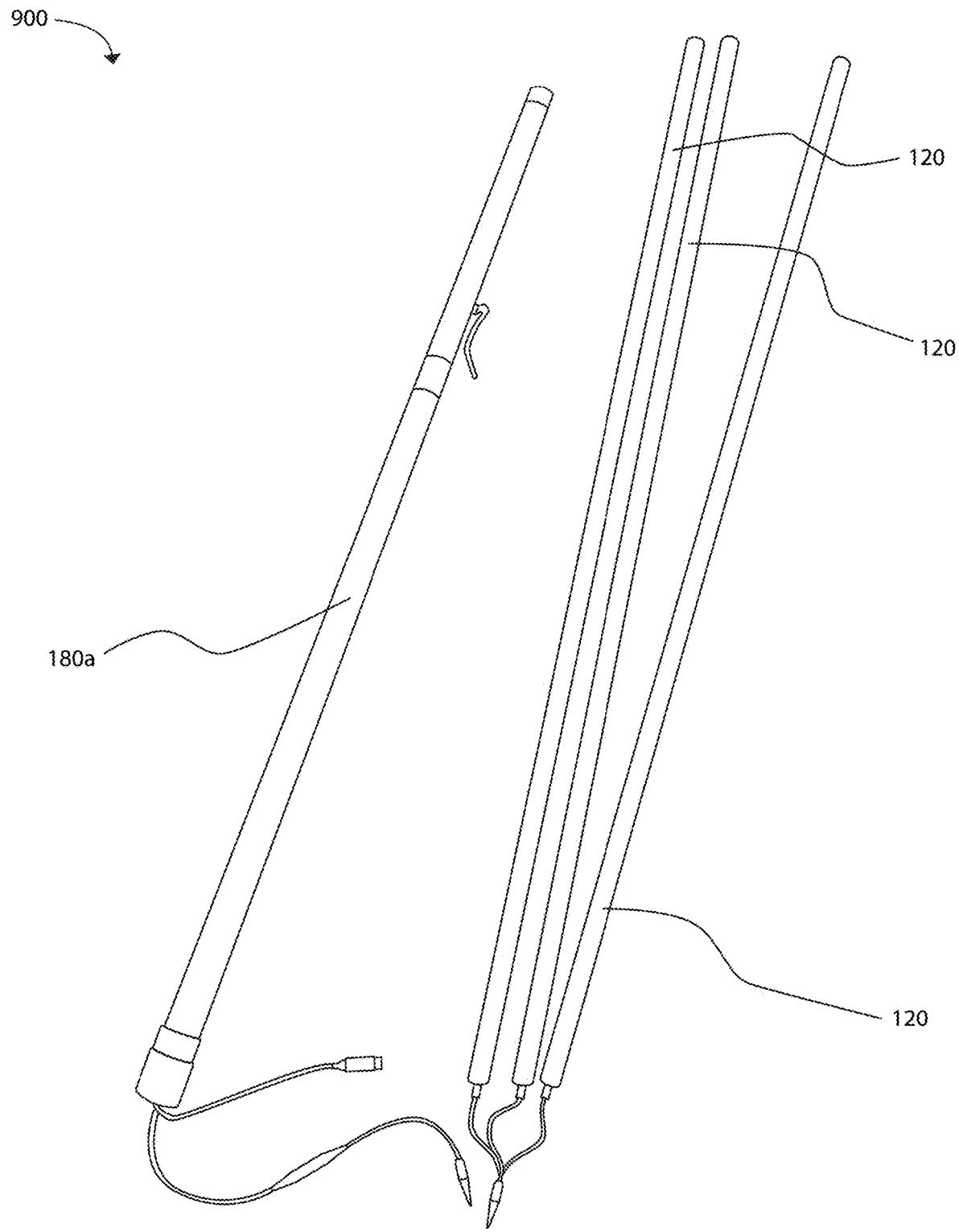
FIG. 9 shows a power source for an outdoor portable light in accordance with an example embodiment.

In another aspect, a power source 180 can comprise a portable battery 180a that is housed within a frame segment 112a, 112b, 112c, or 112d, as illustrated in FIG. 9. In another aspect, the frame segment 112a, 112b, 112c, or 112d can be interchangeable with a different frame segment 112a, 112b, 112c, or 112d housing a different portable battery 180a. In another aspect, the power source 180 a battery segment 180a having a battery segment length and cross-sectional area that is substantially equal to the frame segment 112a, 112b, 112c, or 112d length and cross-sectional area.

In one aspect, the frame segment 112a, 112b, 112c, or 112d can comprise a cigarette lighter adaptor (CLA) socket 170a configured to be coupled to a CLA 185 that can be configured to be coupled to a CLA power supply 180b.

In another aspect, the outdoor portable light 100 can comprise an additional frame segment 112a, 112b, 112c, or 112d coupled to a second end 119a, 119b, 119c, 119d of the frame segment 112a, 112b, 112c, or 112d distal from a first end 118a, 118b, 118c, 118d of the frame segment 112a, 112b, 112c, or 112d. In one aspect, the additional frame segment 112a, 112b, 112c, or 112d can be retractable into the frame segment 112a, 112b, 112c, or 112d and linearly extendible out of the frame segment 112a, 112b, 112c, or 112d.

In another aspect, the additional frame segment 112a, 112b, 112c, or 112d can be operable to pivot relative to the frame segment 112a, 112b, 112c, or 112d. In yet another aspect, the additional frame segment 112a, 112b, 112c, or 112d can be operable to pivot relative to the frame segment 112a, 112b, 112c, or 112d while maintaining wind-resistant stability.

In another aspect, the additional frame segment 112a, 112b, 112c, or 112d can be retractable into the frame segment 112a, 112b, 112c, or 112d to facilitate disassembly. In one aspect, the additional frame segment 112a, 112b, 112c, or 112d can be collapsible to be positioned in a substantially parallel orientation relative to the frame segment 112a, 112b, 112c, or 112d to facilitate disassembly and compact storage of the outdoor portable light.

Figure 2A:
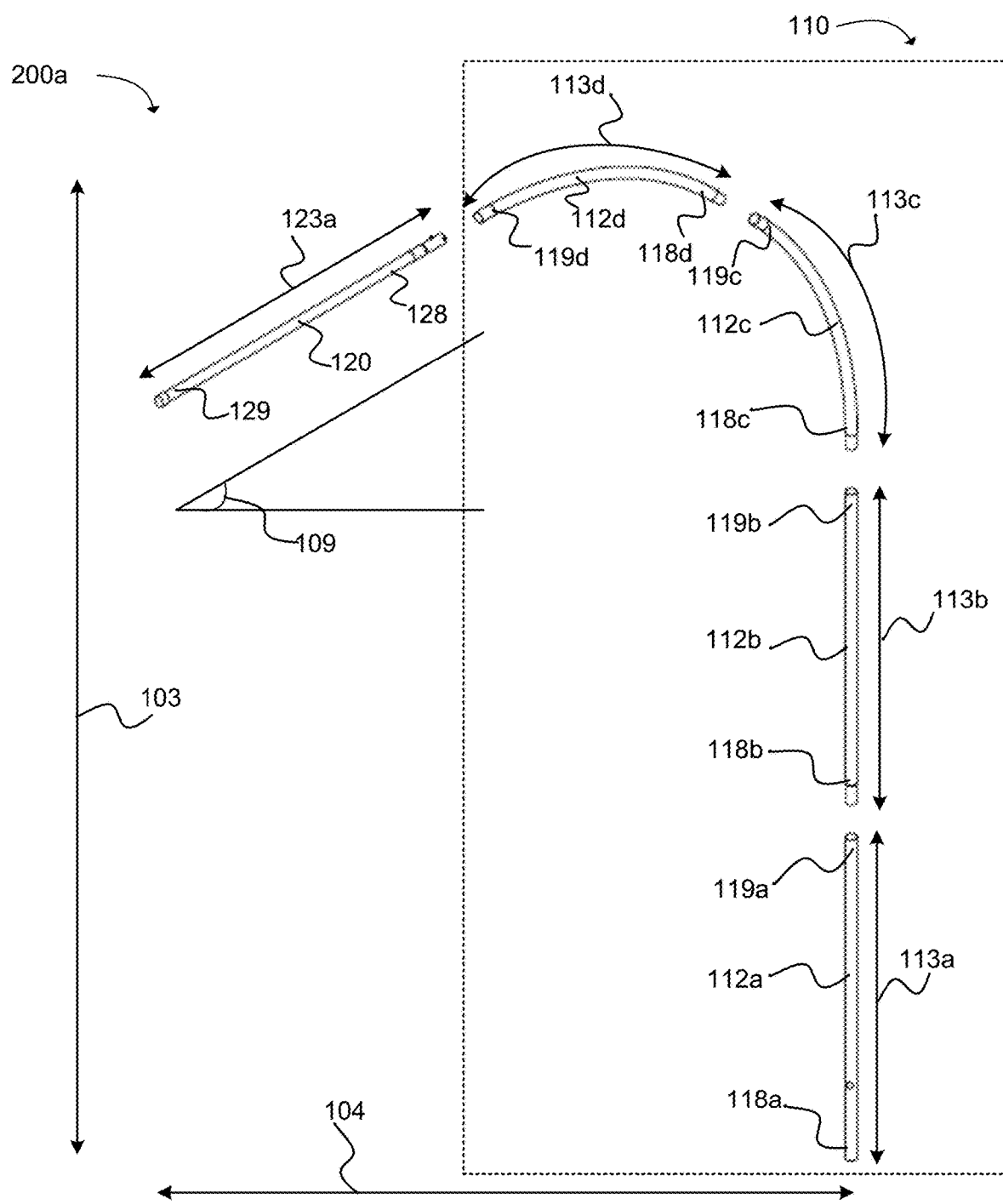
FIG. 2A shows an exploded side view of an outdoor portable light in accordance with an example embodiment.
Figure 2B:
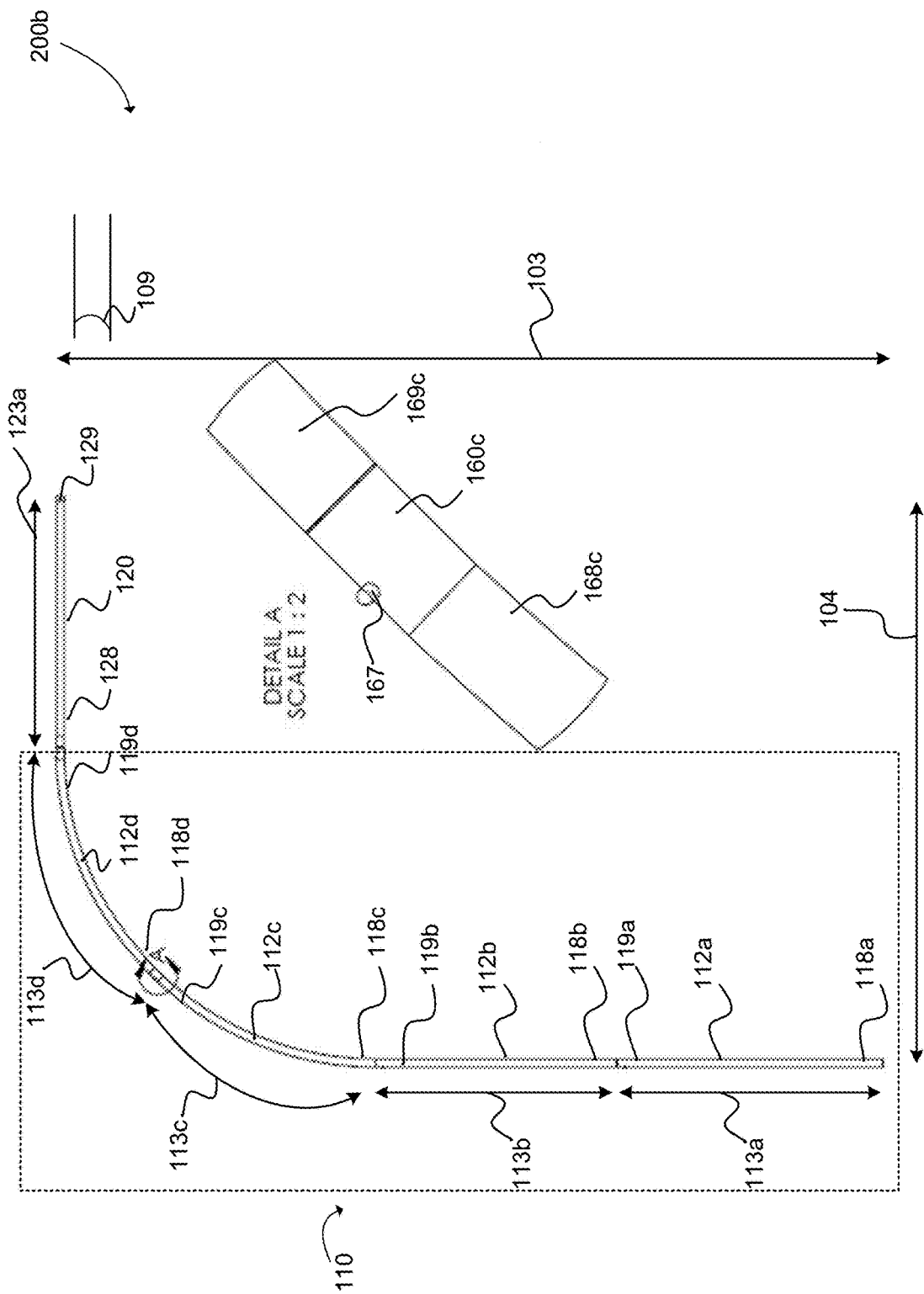
FIG. 2B shows a side view of an outdoor portable light in accordance with an example embodiment.

With this initial overview in mind, the devices and methods of the current disclosure will be further described with respect to additional figures. In one embodiment, FIG. 2A illustrates an exploded view of an outdoor portable light 200a. In another example, FIG. 2B illustrates an outdoor portable light, in which the angle from horizontal 109 is equal to about 0° because the light segment 120 is approximately horizontal with respect to the horizontal plane. The one or more connectors 160a, 160b, 160c, 160d can comprise a first end 168c, a middle segment 160c, and a second end 169c.

In one aspect, the middle segment 160c can comprise a pin 167. In another example, FIG. 3A illustrates an exploded view of a light segment 300a. In this example, the light segment 300a can comprise a cap 135, an outer housing 140, a light source housing 136, a light source strip 137, a connector 167d, the like, or a combination thereof. In another example, FIGS. 3B and 3C illustrate an assembled light segment 300b. The light segment 300b can comprise a cap 135, an outer housing 140, and a connector 160d. In another example, FIG. 3D illustrates a cross-sectional view of a light segment 300d. In this example, the outer housing 140 can encase the light segment housing 136. The light segment housing 136 can form light source recesses 136a, 136b, 136c, 136d, 136e, 136f, wire recess 138a, 138b, 138c, 138d, 138e, 138f, and one or more wires 139.

Figure 4:
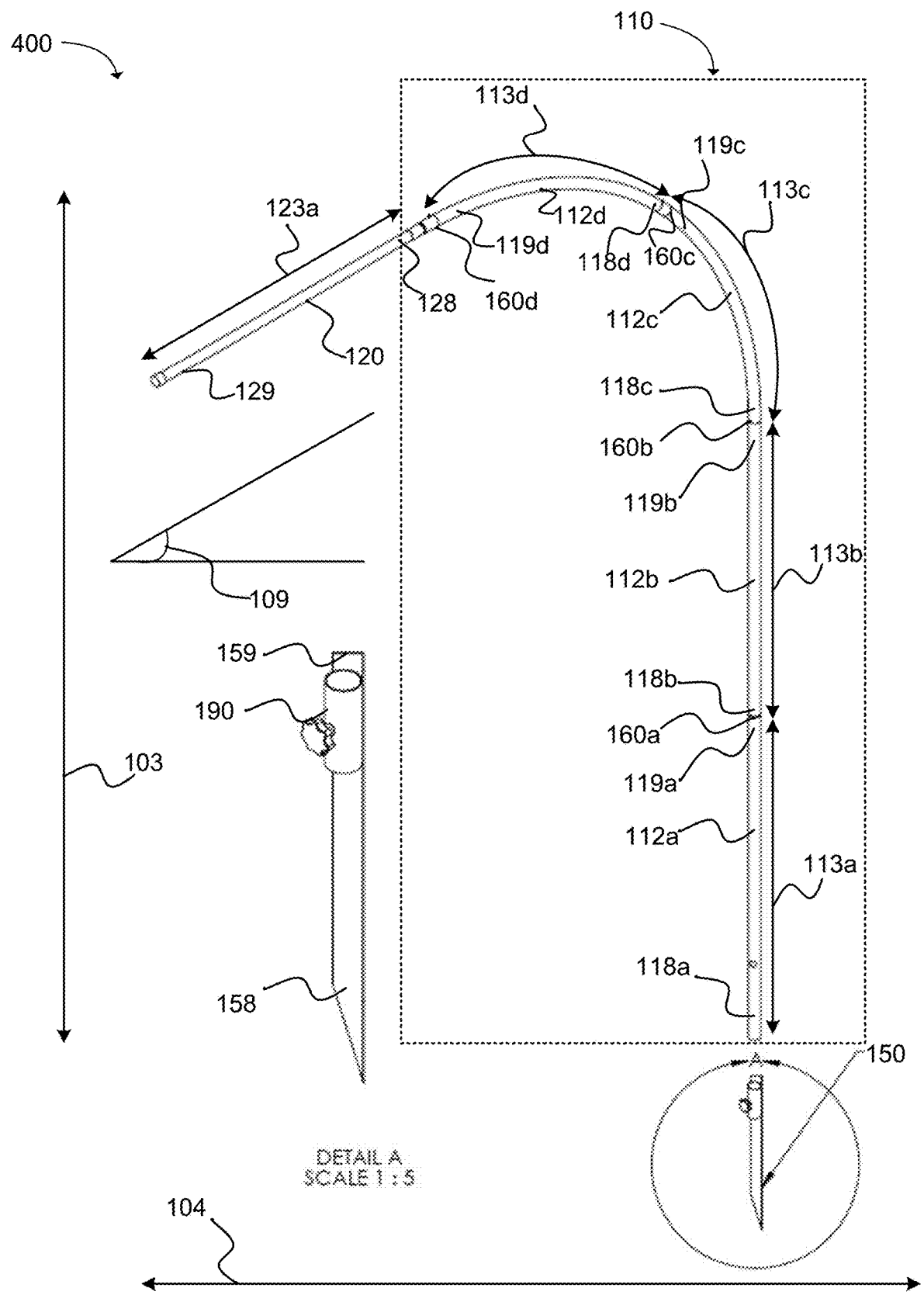
FIG. 4 shows a side view of an outdoor portable light in accordance with an example embodiment.

In another example, FIG. 4 illustrates an outdoor portable light 400. In this example, a reversible frame segment anchor 150 can comprise: a first end 158 that can be operable to be inserted into a ground to secure the outdoor portable light 400; a second end 159 that can be operable to be coupled to a first end 118a, 118b, 118c, 118d of a frame segment 112a, 112b, 112c, 112d; and a tube operable to receive a first end 118a, 118b, 118c, 118d of a frame segment 112a, 112b, 112c, 112d.

Figure 5A:
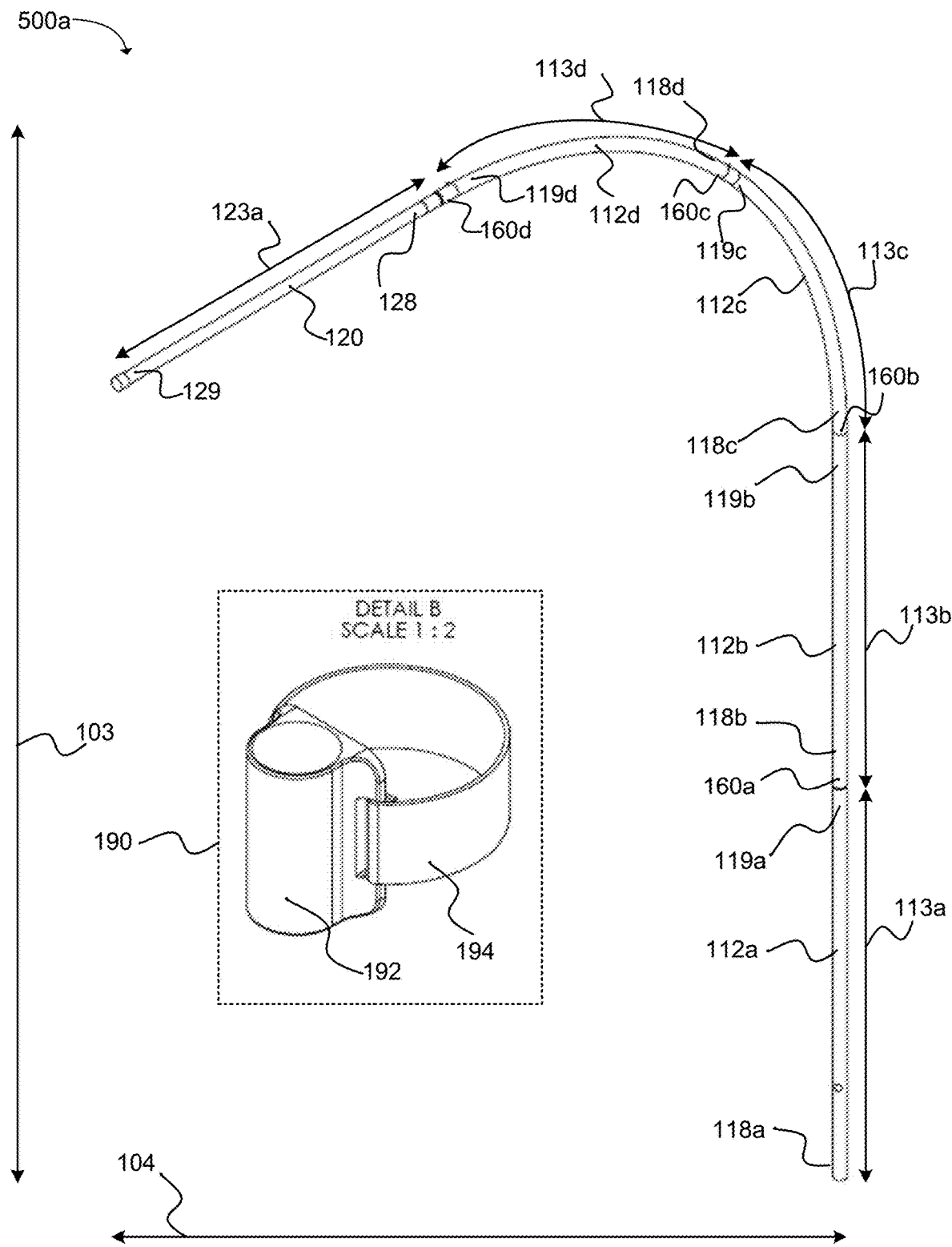
FIG. 5A shows a side view of an outdoor portable light in accordance with an example embodiment.
Figure 5B:
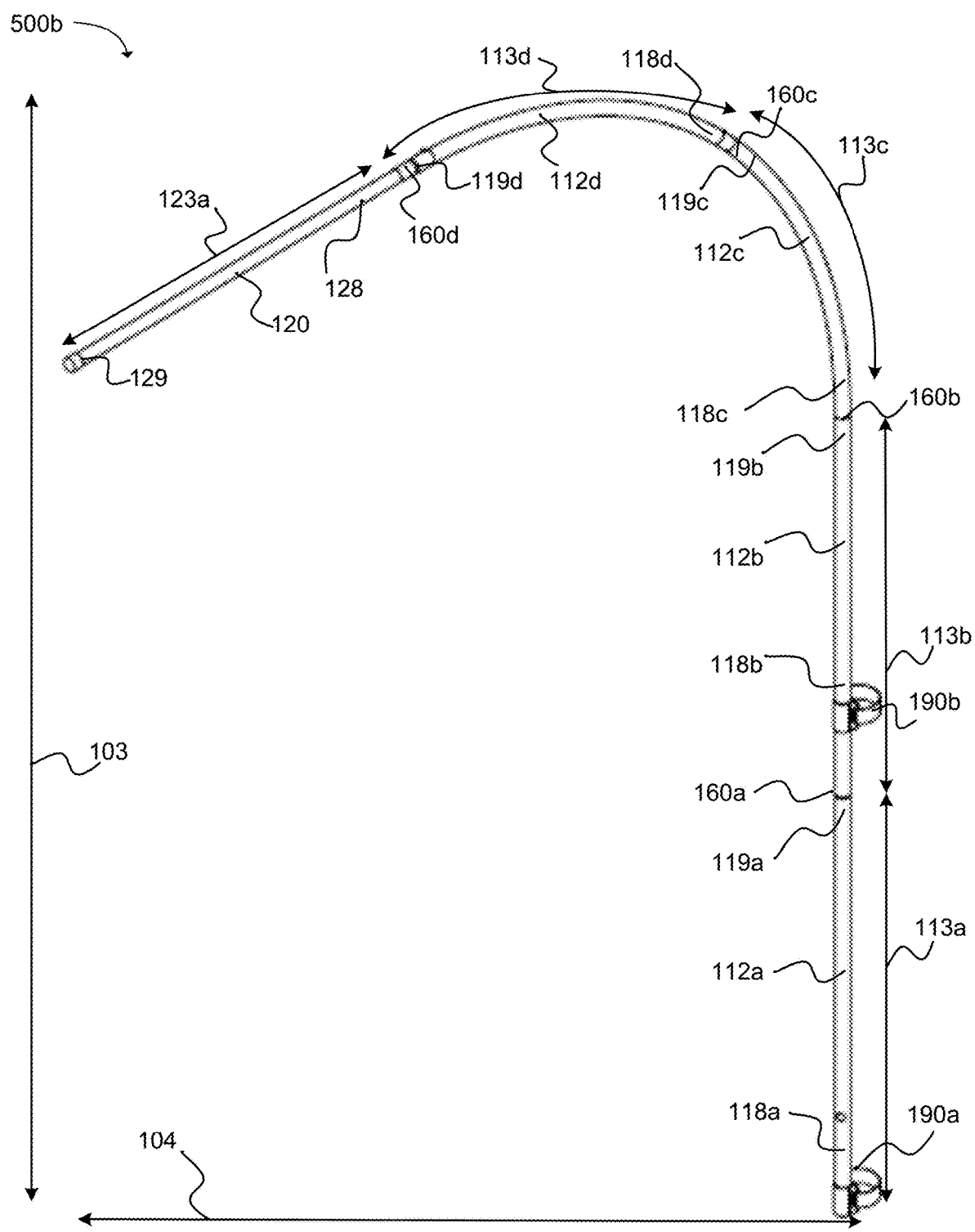
FIG. 5B shows a side view of an outdoor portable light in accordance with an example embodiment.

In another example, FIG. 5A illustrates an outdoor portable light 500a. In this example, a fixturing device 190 can comprise a base 192 and a strap 194. As illustrated in FIG. 5B, the outdoor portable light 500b can comprise one or more fixturing devices 190a, 190b.

Figure 6A:
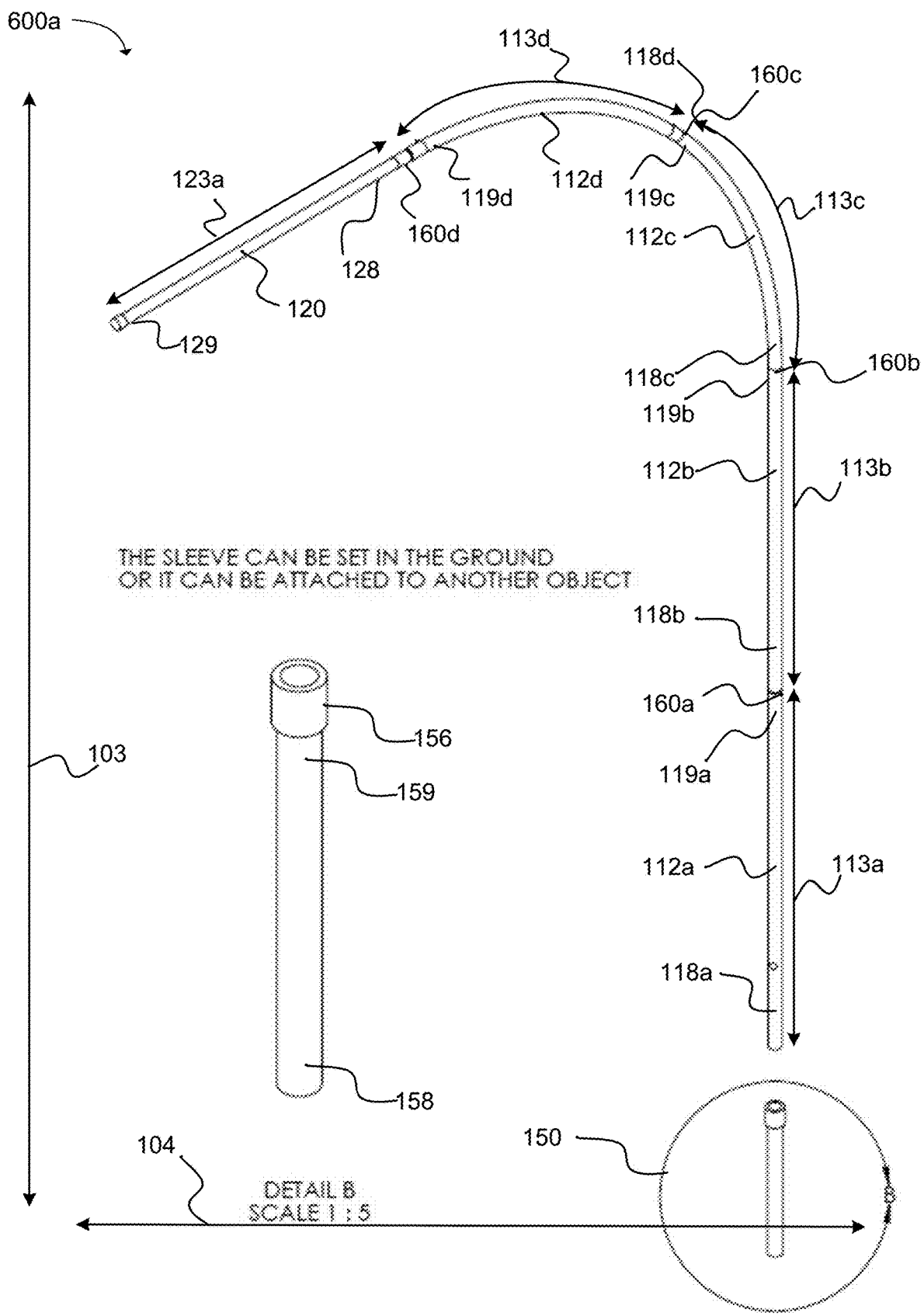
FIG. 6A shows a side view of an outdoor portable light in accordance with an example embodiment.

In another example, FIG. 6A illustrates an outdoor portable light 600a comprising a reversible frame segment anchor 150 that can comprise a sleeve 156, a first end 158, and a second end 159. The first end 158 can be operable to be set in the ground or attached to another object. The sleeve 156 at the second end 158 can be operable to be coupled to a first end 118a, 118b, 118c, 118d of a frame segment 112a, 112b, 112c, 112d.

Figure 6B:
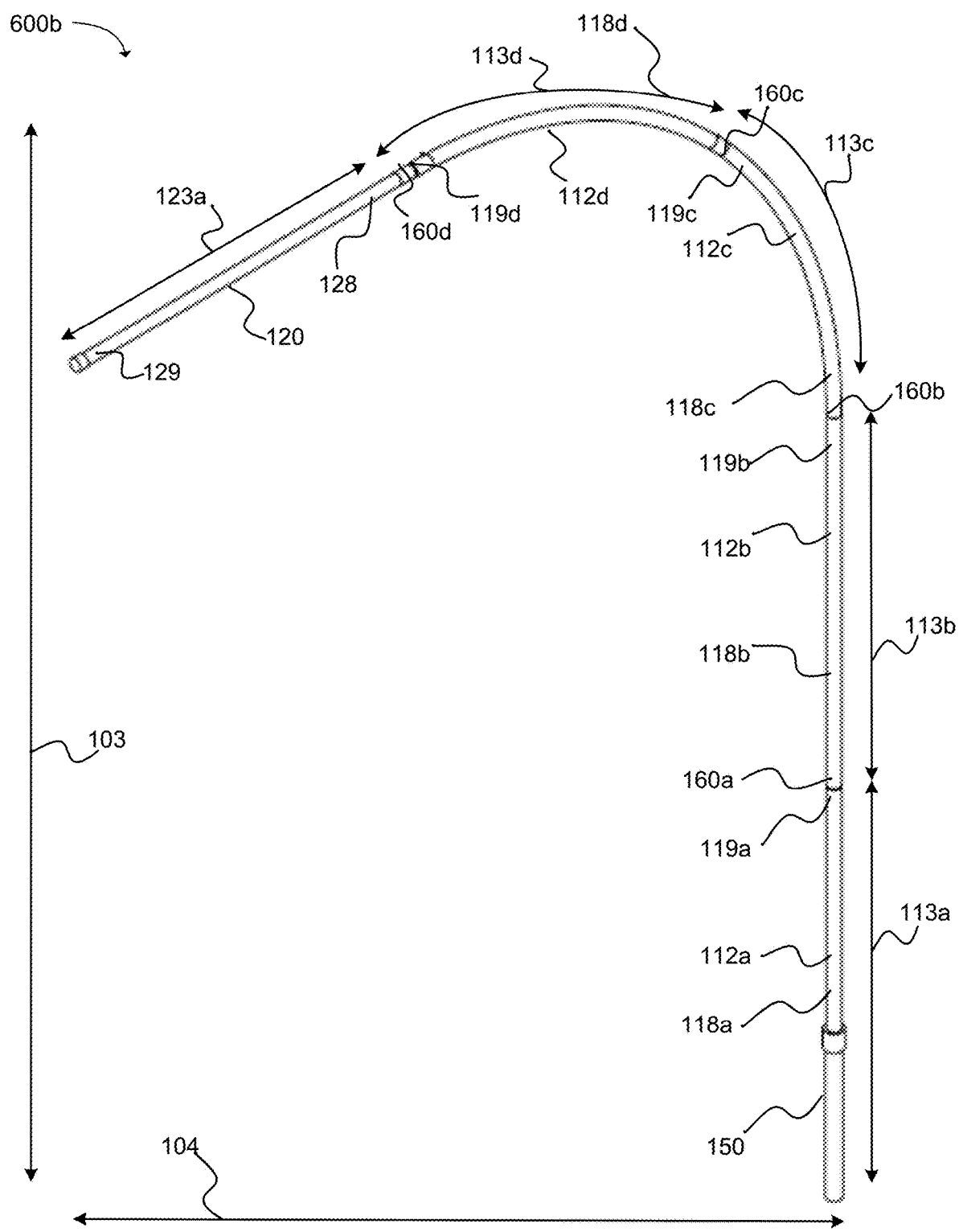
FIG. 6B shows a side view of an outdoor portable light in accordance with an example embodiment.
Figure 6C:
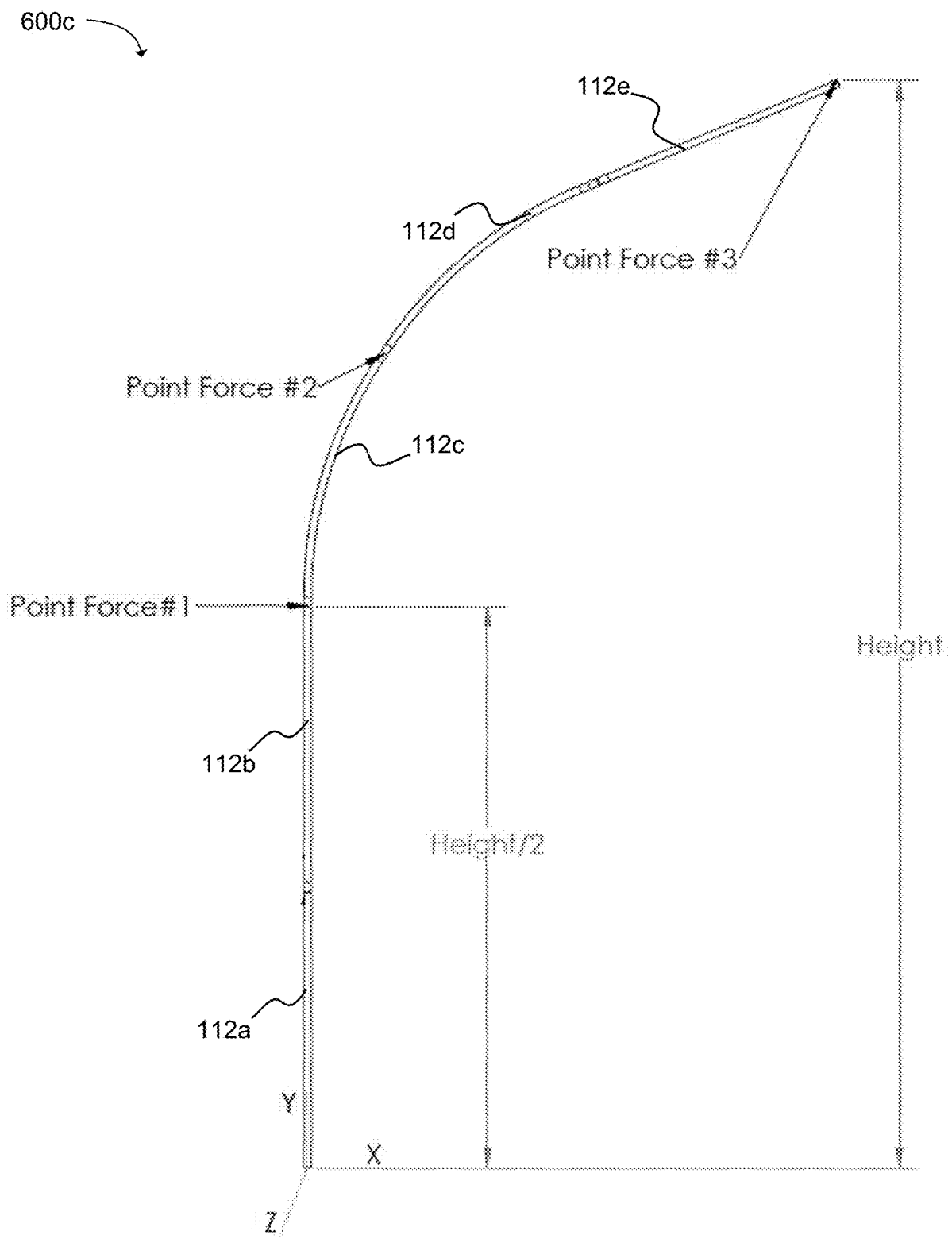
FIG. 6C shows a side view of an outdoor portable light with a view of a plurality of point forces in accordance with an example.

In another example, FIG. 6B illustrates an outdoor portable light 600b comprising a reversible frame segment anchor 150 coupled to the outdoor portable light 600b.

Figure 7:
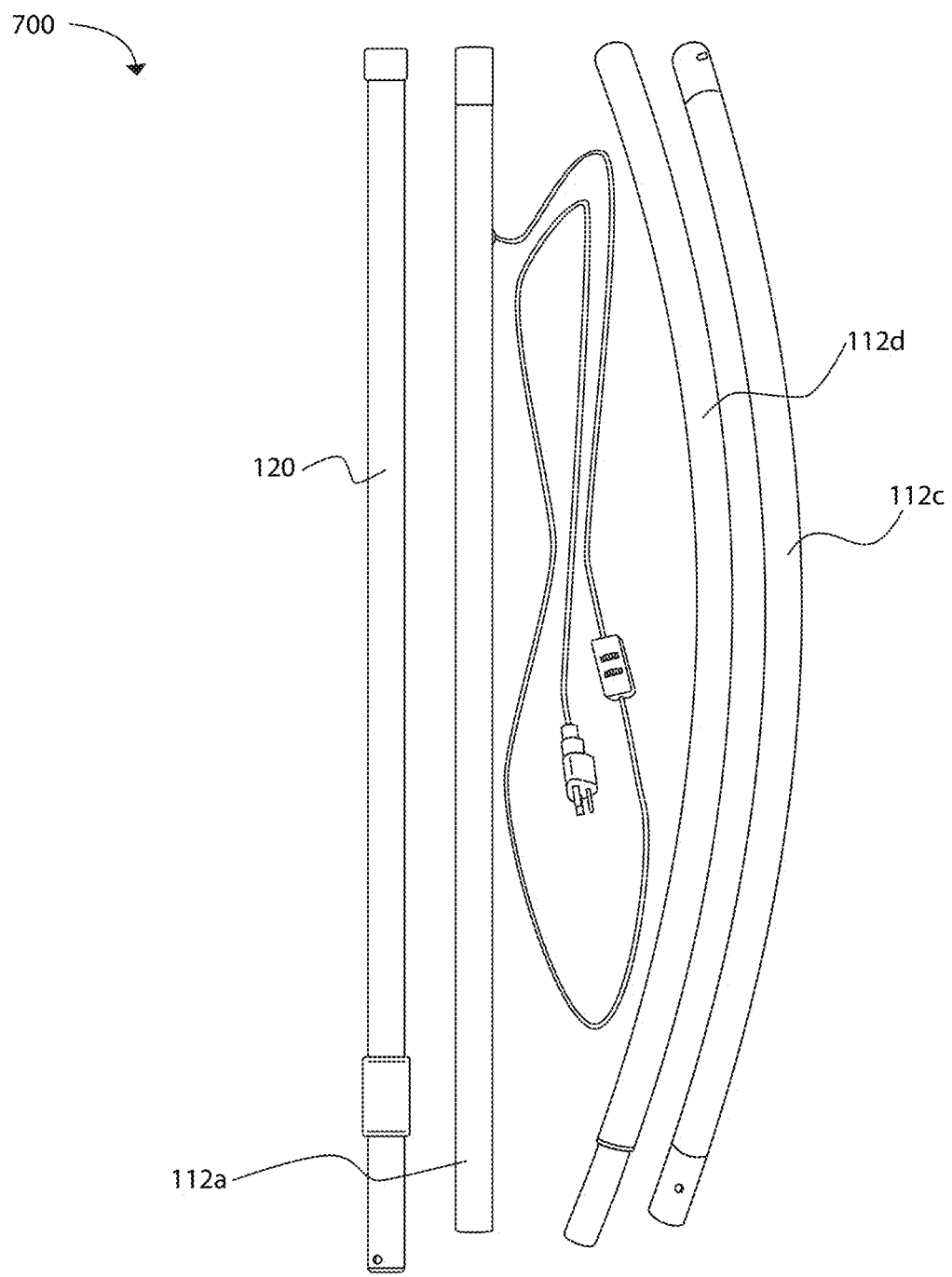
FIG. 7 shows a disassembled outdoor portable light in accordance with an example embodiment.
Figure 8B:
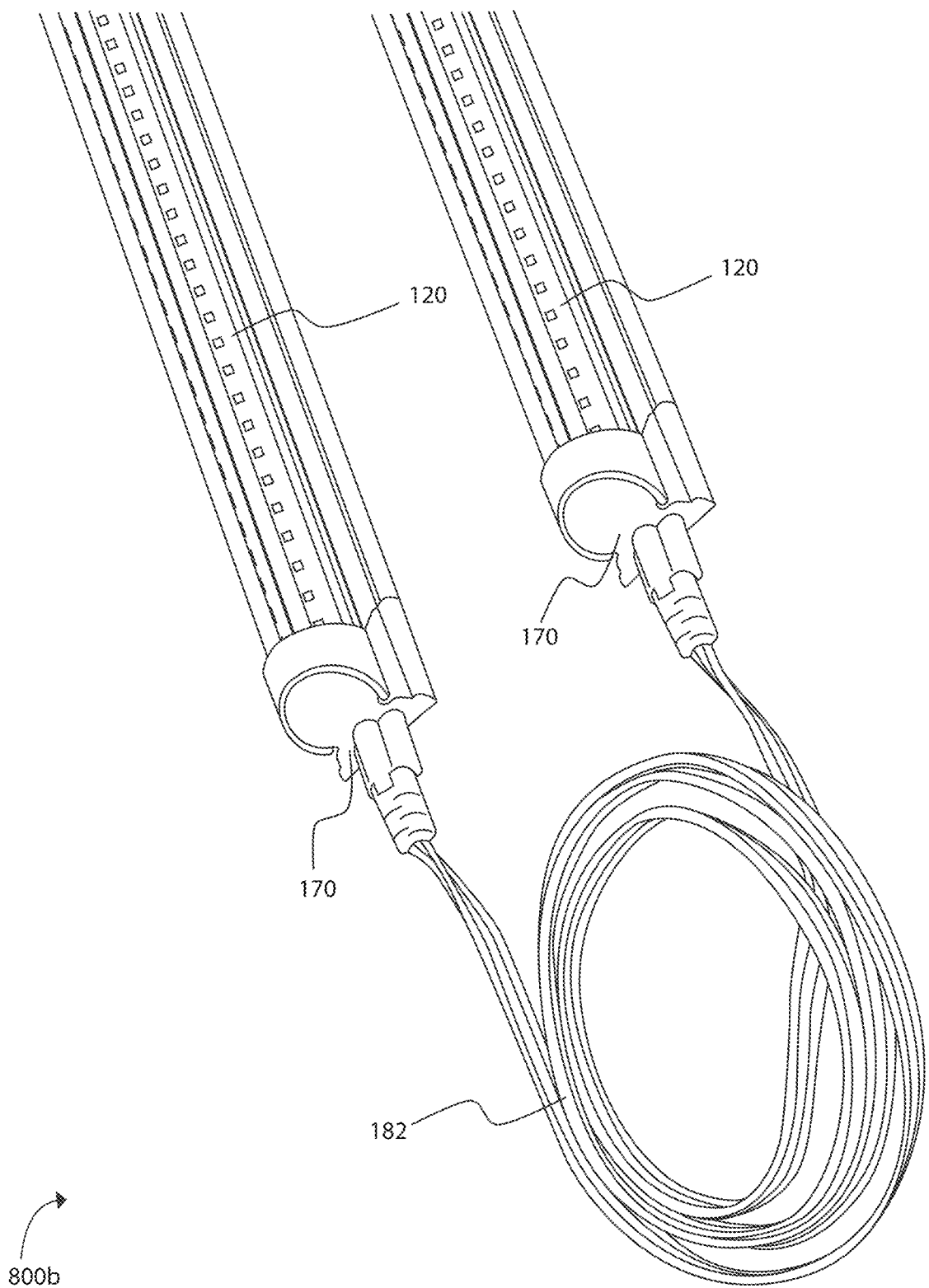
FIG. 8B shows connection methods for an outdoor portable light in accordance with an example embodiment.
Figure 8C:
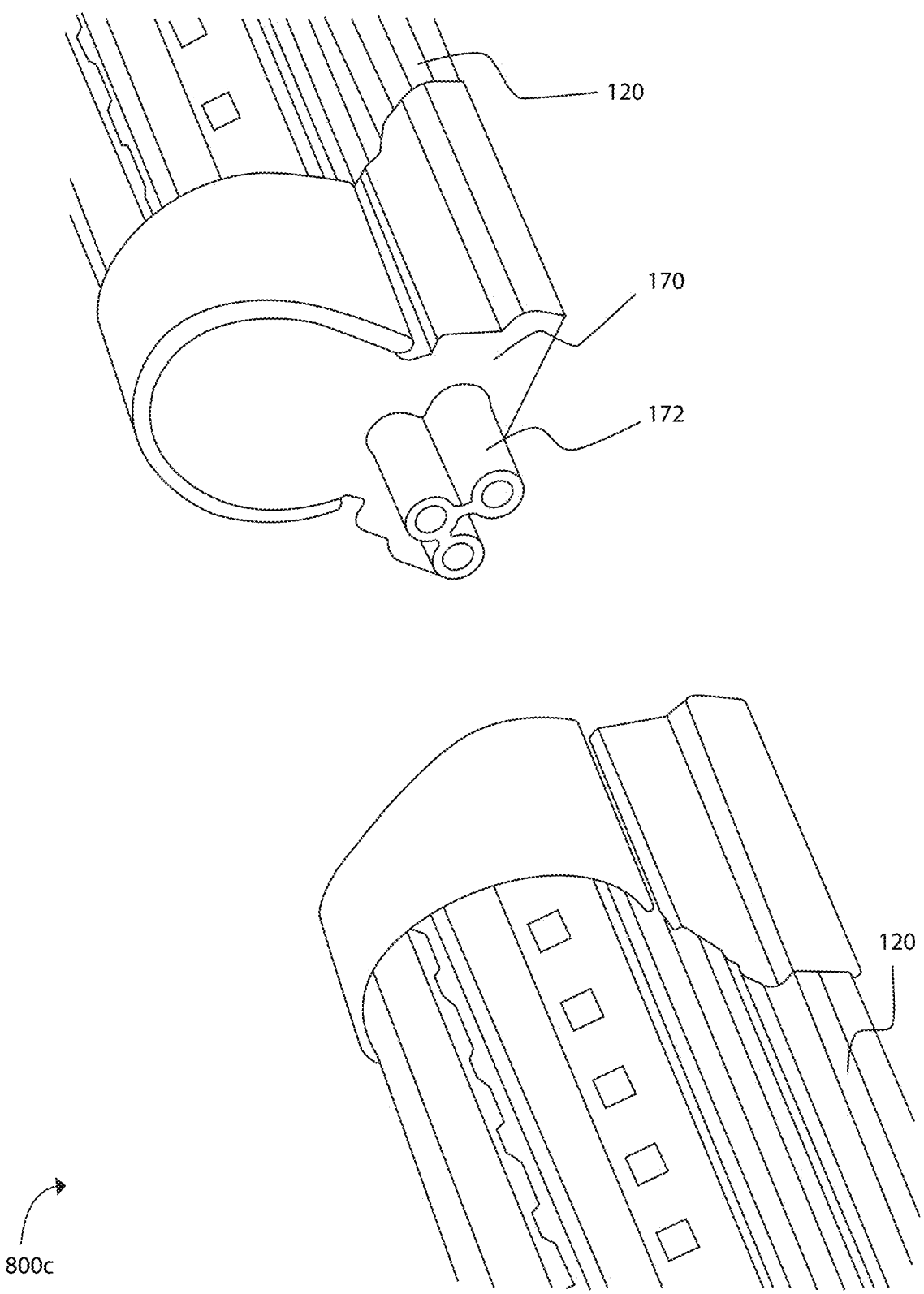
FIG. 8C shows connection methods for an outdoor portable light in accordance with an example embodiment.
Figure 8D:
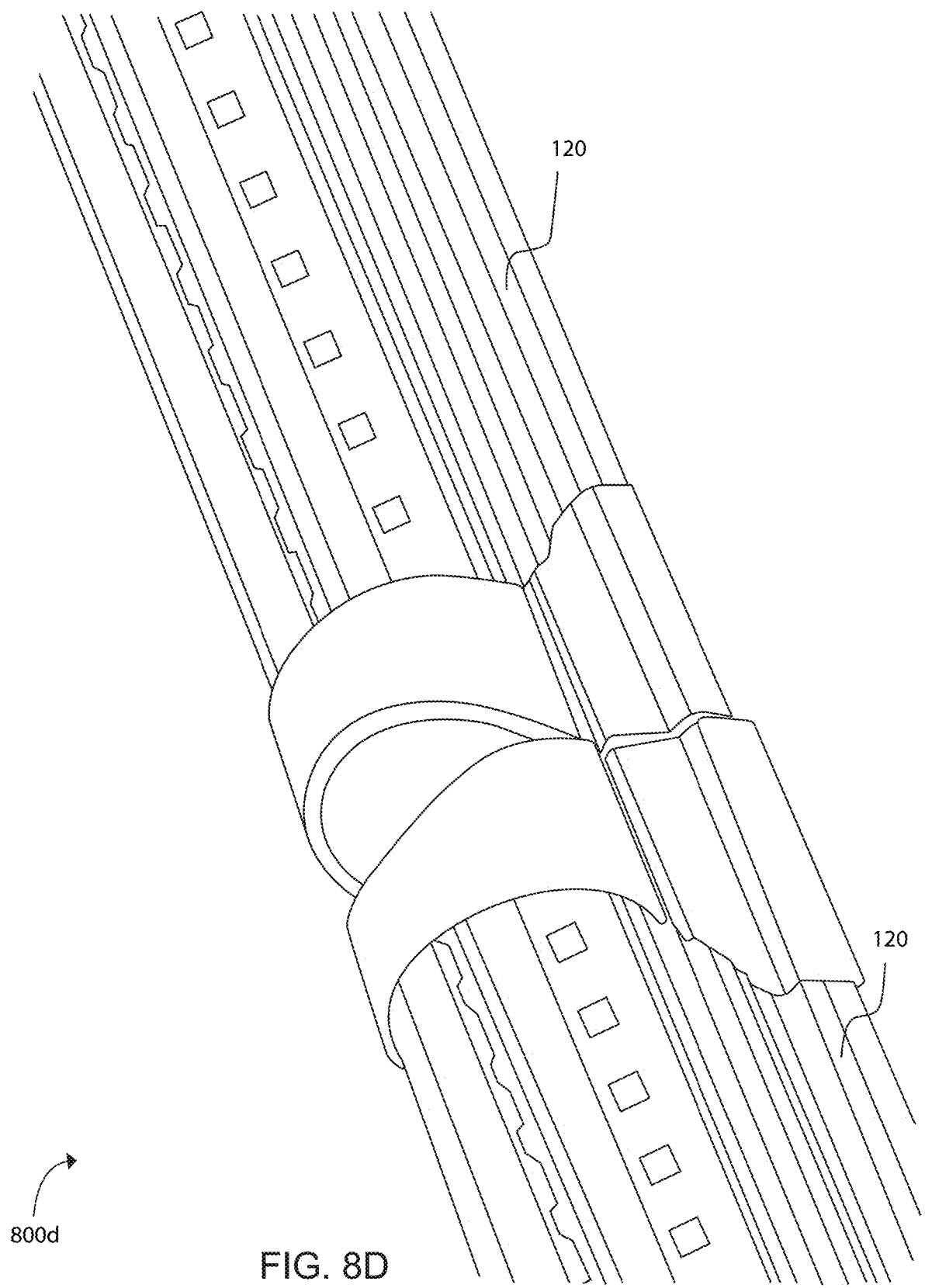
FIG. 8D shows an outdoor portable light in accordance with an example embodiment.

In another example, FIG. 7 illustrates a disassembled outdoor portable light 700 comprising a light segment 120 and frame segments 112a, 112c, and 112d. In another example, FIG. 8A illustrates a light segment 120 comprising a socket 170. In another example, FIG. 8B illustrates connection methods 800b for a light segment 120 comprising a socket 170 and a wire 182. In another example, FIG. 8C illustrates a connection method 800c for a light segment 120 comprising a socket 170 and a connector 172. In another example, FIG. 8D illustrates a connection method 800d for a light segment 120. In another example, the socket illustrated in FIGS. 8A to 8C can comprise a barrel socket (e.g., a DC5525 barrel socket).

In another example, FIG. 9 illustrates an outdoor portable light 900 comprising a light segment 120 and a power source comprising a battery pack 180a.

Figure 10A:
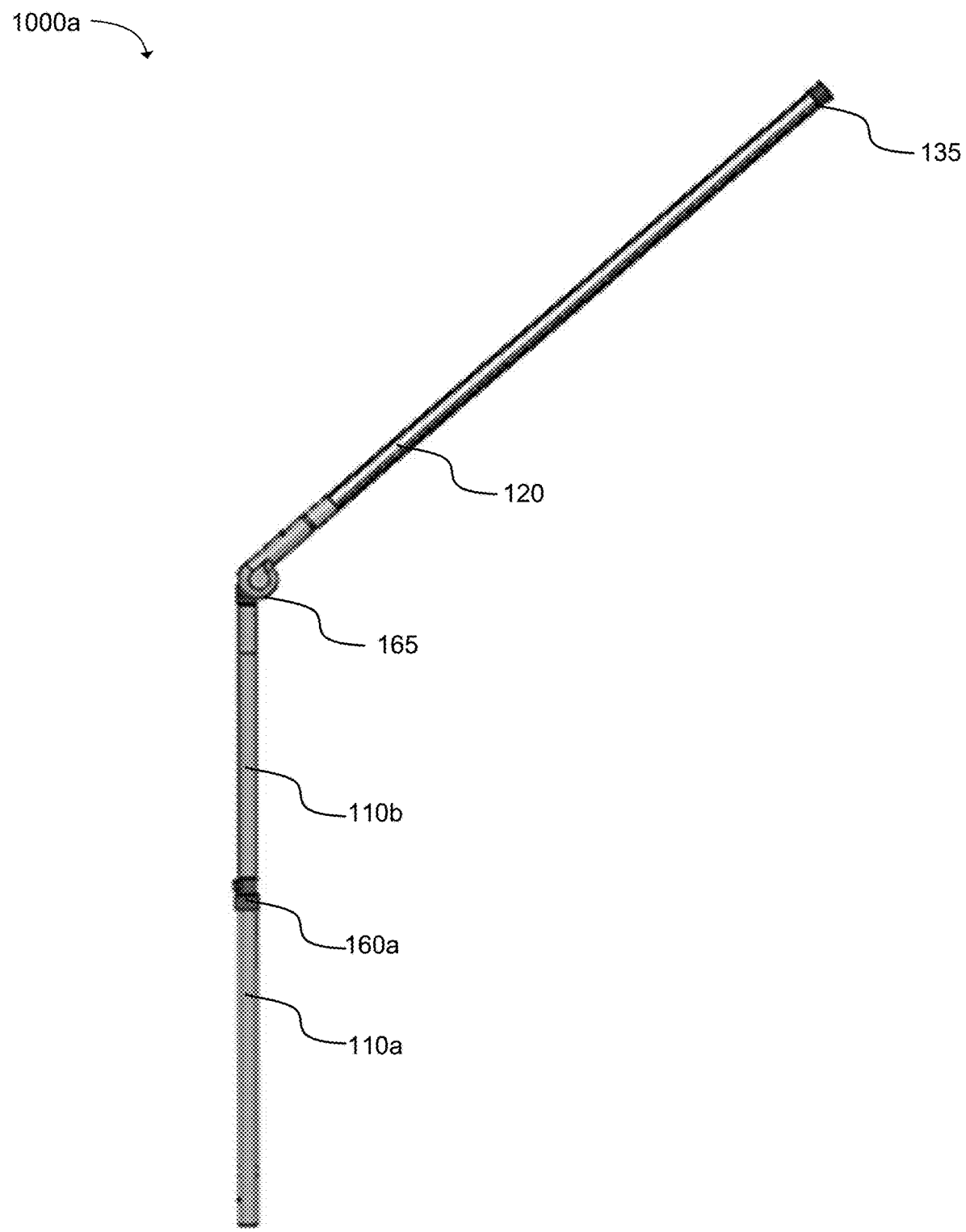
FIG. 10A shows a side view of an outdoor portable light in accordance with an example embodiment.

In another example, FIG. 10A illustrates an outdoor portable light 1000a comprising frame segments 110a, 110b, a light segment 120, a cap 135, a connector 160a, and a pivot 165.

Figure 10B:
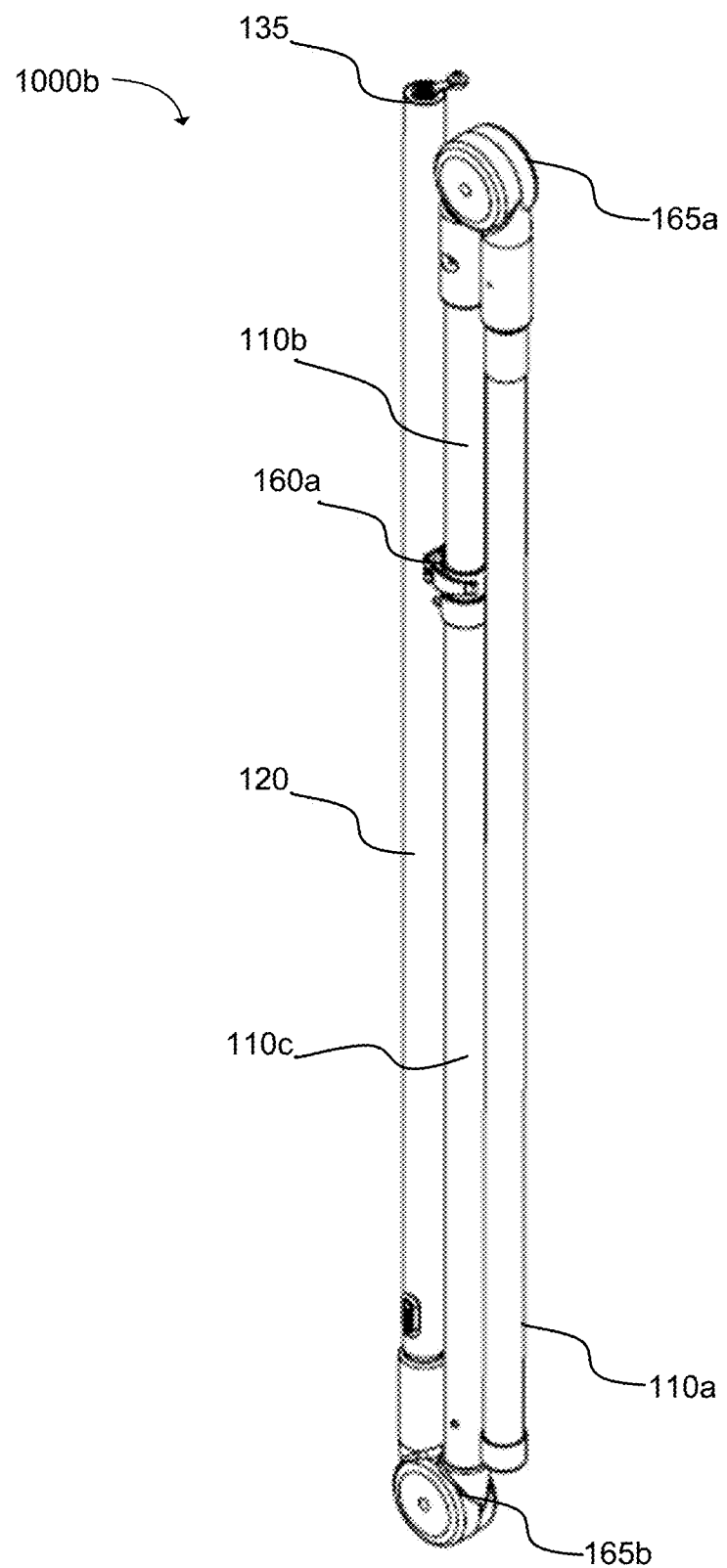
FIG. 10B illustrates a perspective view of a foldable outdoor portable light in accordance with an example embodiment.

In another example, FIG. 10B illustrates a perspective view of a foldable outdoor portable light 1000b comprising frame segments 110a, 110b, 110c, a light segment 120, a cap 135, pivots 165a, 165b, and a connector 160a.

In one example, frame segment 110*a* can be coupled to frame segment 110*b* using a pivot 165*a*. The pivot 165*a* can be any suitable pivoting joint that can be configured to move along a single axis. In one example, the pivot 165*a* can be a ratchet joint. In one example, the ratchet point can be a push-button ratchet joint.

In another example, the frame segment 110*b* can be coupled to the frame segment 110*c* using a connector 160*a*. In one example, the connector 160*a* can be a telescoping tubing connector that is suitable to: couple frame segment 110*b* to frame segment 110*c*; or facilitate extension from frame segment 110*b* for frame segment 110*c* and retraction into frame segment 110*b* for frame segment 110*c*; or facilitate extension from frame segment 110*c* for frame segment 110*b* and retraction into frame segment 110*c* for frame segment 110*b*. In addition, it should be understood that in some embodiments, multiple segments, including any of a segment in contact with a base or anchor, an intermediate segment or a top segment can be capable of telescoping and joined in such a manner. In some embodiments only a middle or intermediate segment can be capable of telescoping.

Figure 10C:
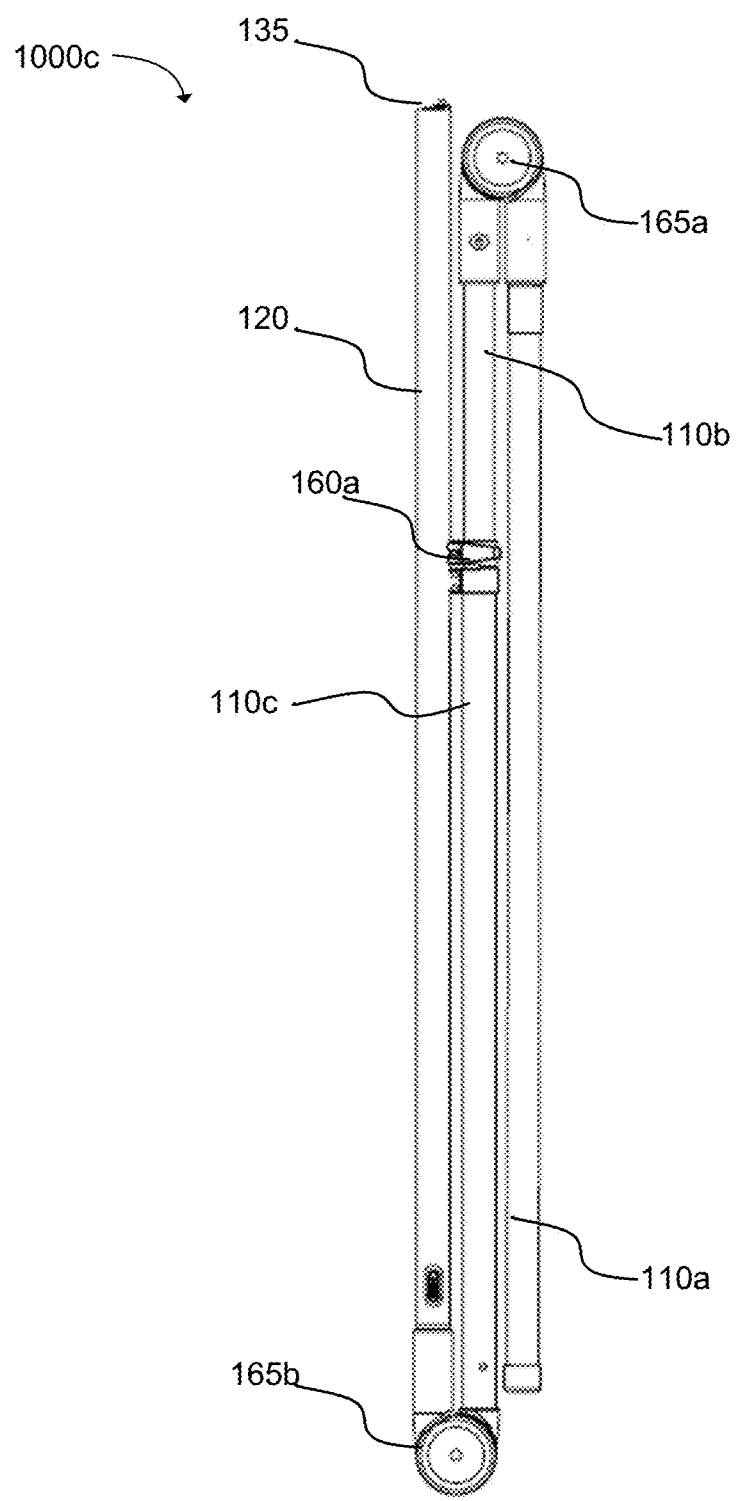
FIG. 10C illustrates a side view of a foldable outdoor portable light in accordance with an example embodiment.

In another example, FIG. 10C illustrates a side view of a foldable outdoor portable light 1000*c* comprising frame segments 110*a*, 110*b*, 110*c*, a light segment 120, a cap 135, pivots (e.g. a hinge or the like) 165*a*, 165*b*, and a connector 160*a*.

Figure 10D:
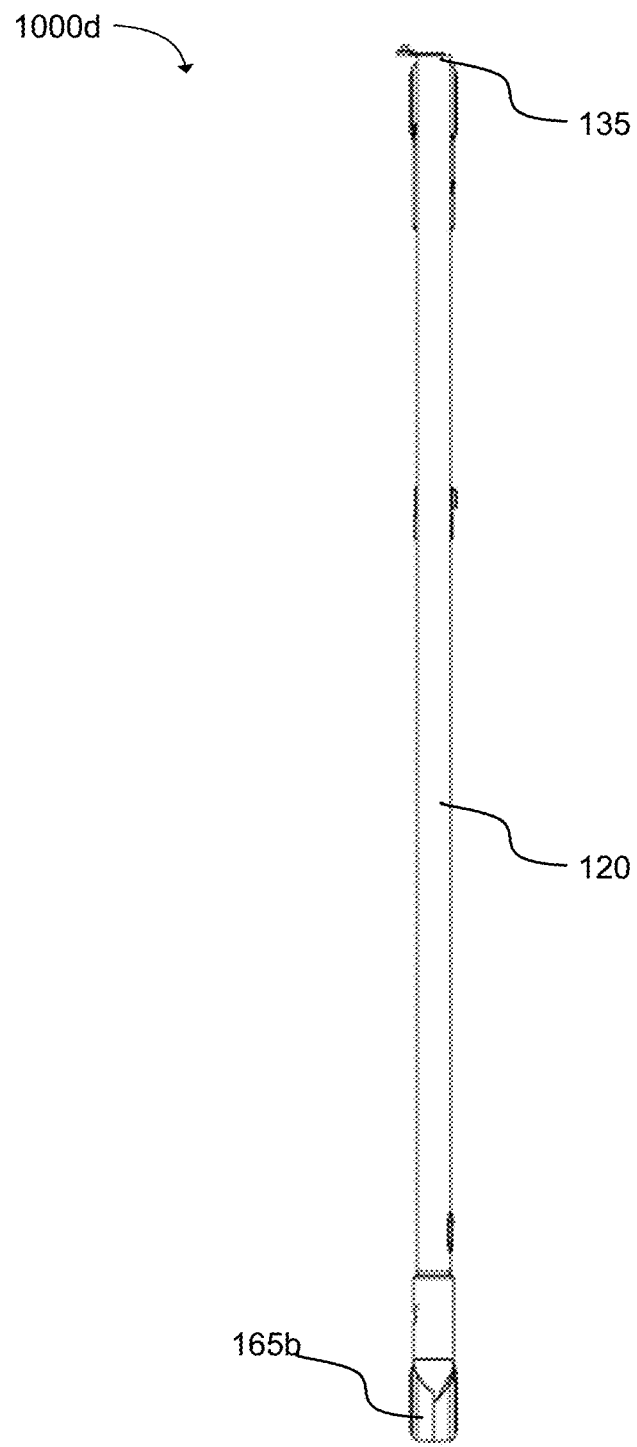
FIG. 10D illustrates a back view of a foldable outdoor portable light in accordance with an example embodiment.

In another example, FIG. 10D illustrates a back view of a foldable outdoor portable light 1000*d* showing a light segment 120, a cap 135, and a pivot 165*b*.

Figure 10E:
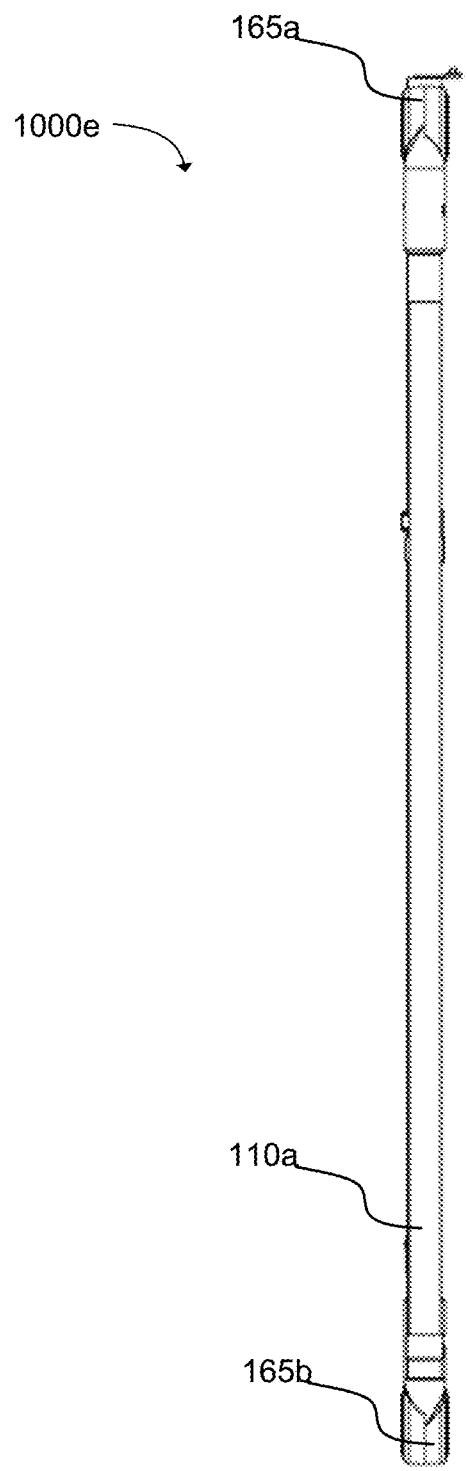
FIG. 10E illustrates a front view of a foldable outdoor portable light in accordance with an example embodiment.

In another example, FIG. 10E illustrates a front view of a foldable outdoor portable light 1000*e* showing frame segment 110*a*, and pivots 165*a*, 165*b*.

Figure 10F:
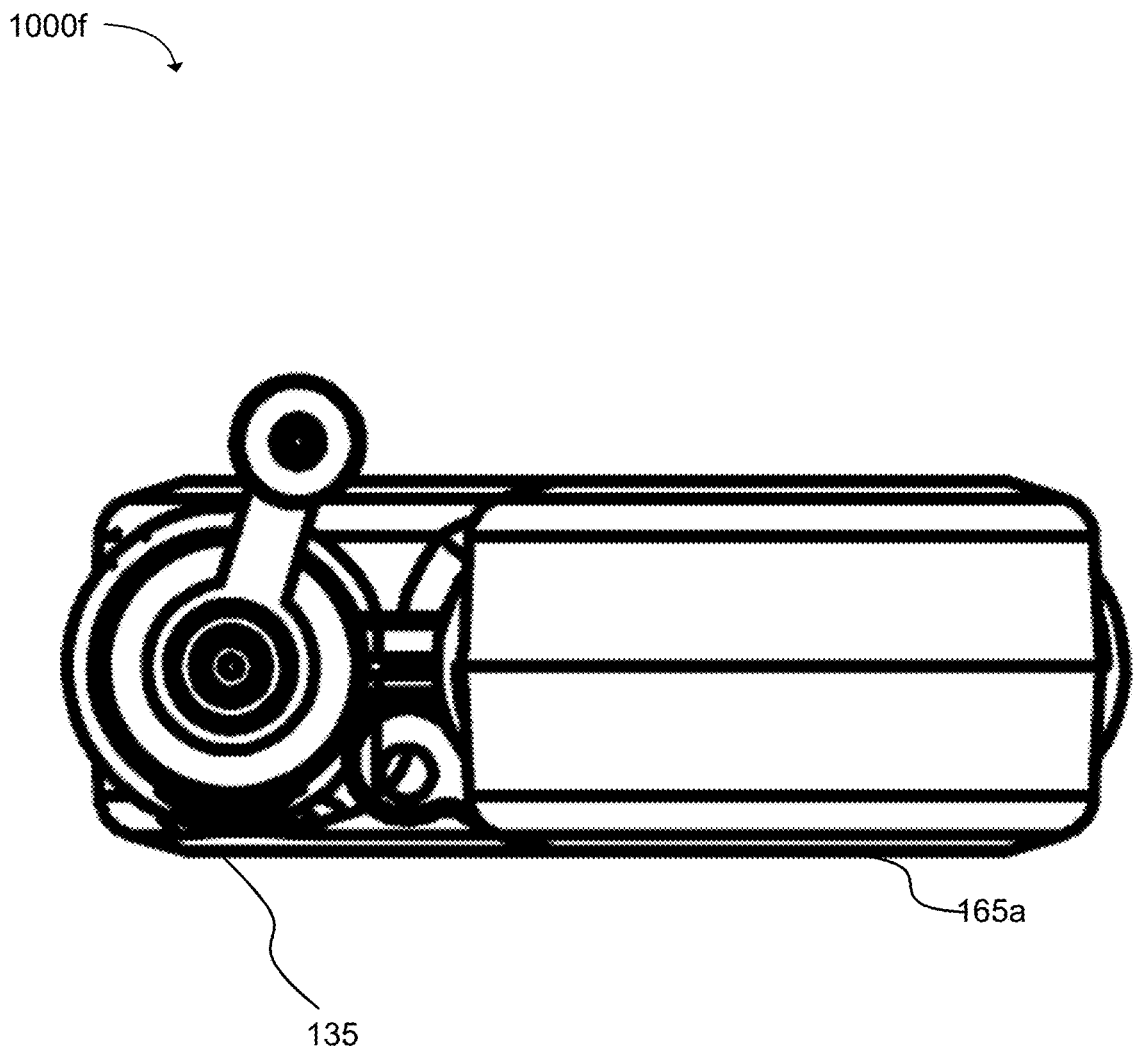
FIG. 10F illustrates a top view of a foldable outdoor portable light in accordance with an example embodiment.

In another example, FIG. 10F illustrates a top view of a foldable outdoor portable light 1000*f* showing a cap 135 and a pivot 165*a*.

Figure 10G:
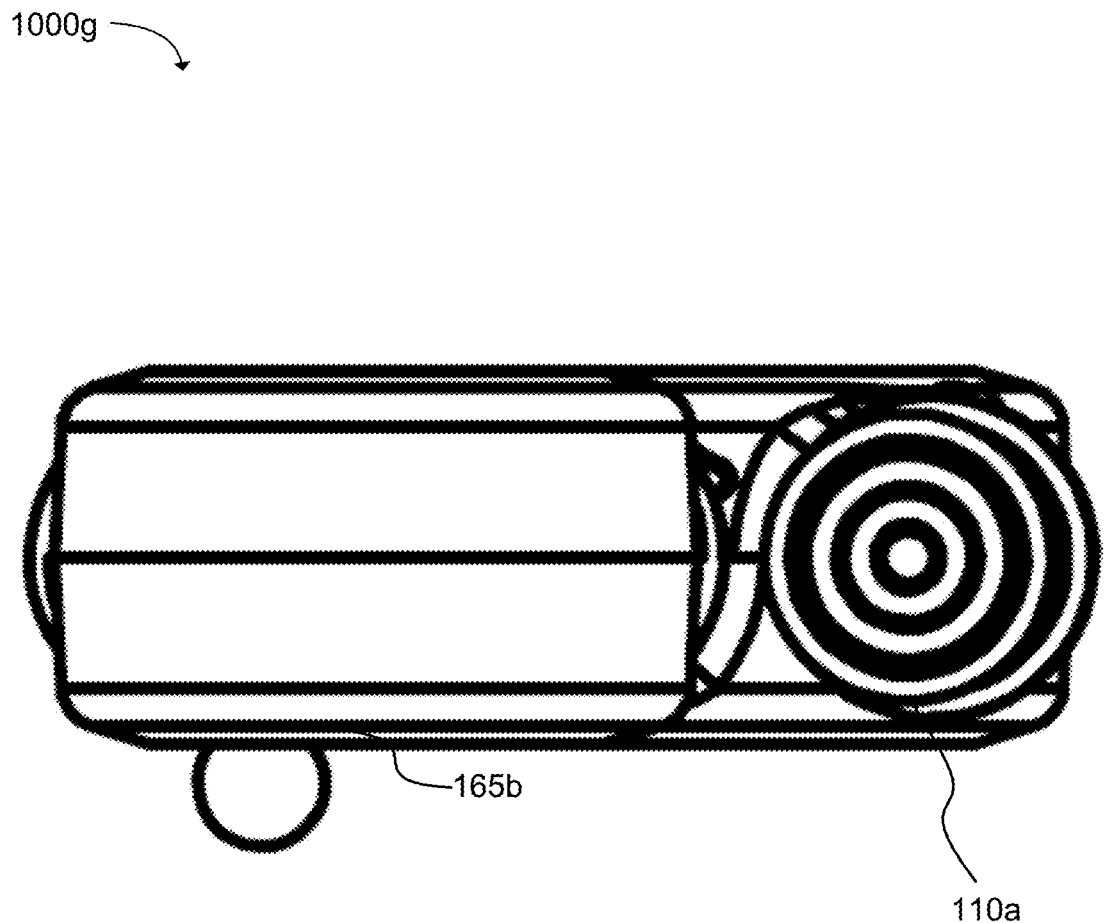
FIG. 10G illustrates a bottom view of a foldable outdoor portable light in accordance with an example embodiment.

In another example, FIG. 10G illustrates a bottom view of a foldable outdoor portable light 1000*g* showing a frame segment 110*a* and a pivot 165*a*.

Figure 10H:
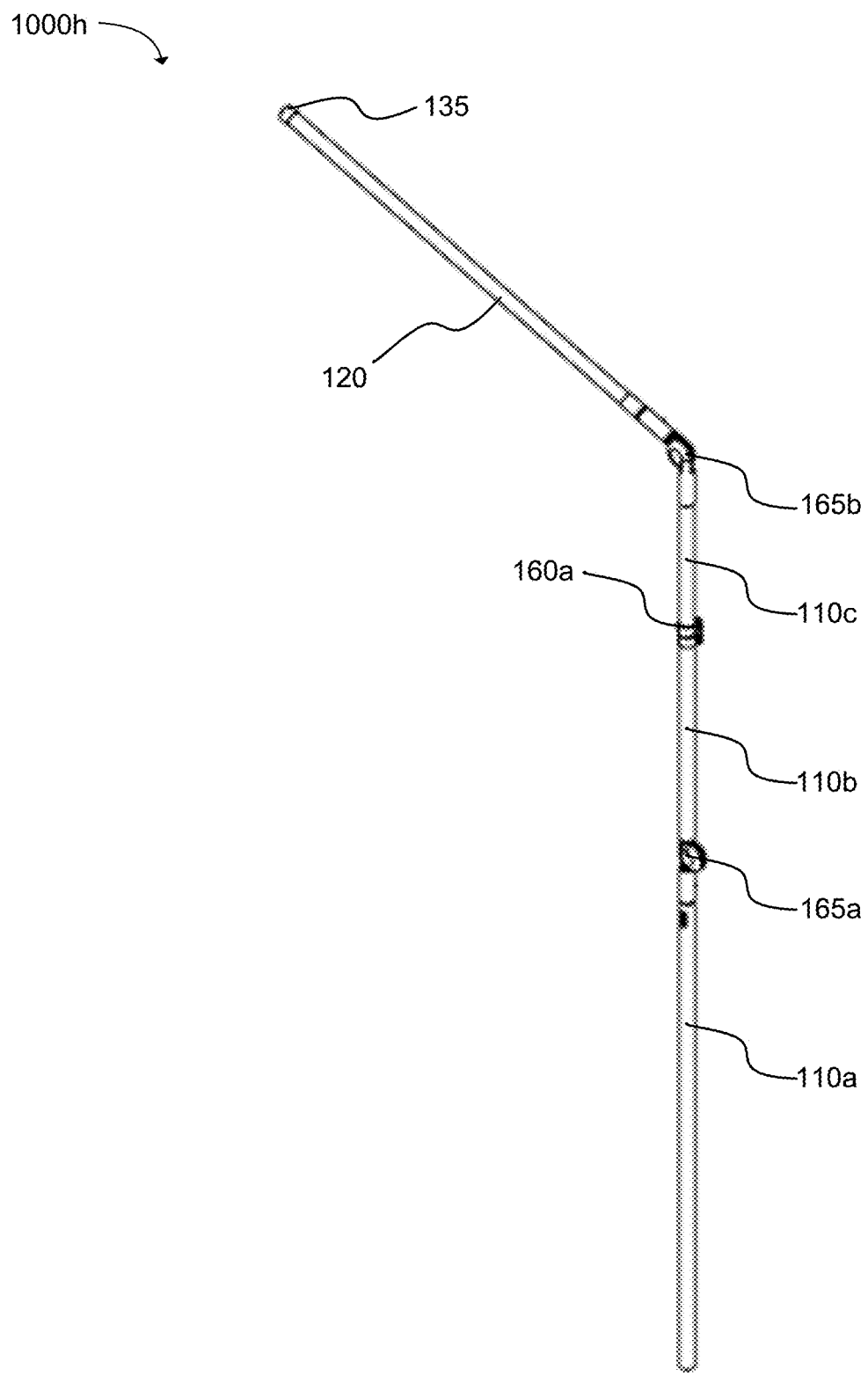
FIG. 10H illustrates a perspective view of an extendible outdoor portable light in accordance with an example embodiment.

In another example, FIG. 10H illustrates a perspective view of an extendible outdoor portable light 100*h* comprising frame segments 110*a*, 110*b*, 110*c*, a light segment 120, a cap 135, pivots 165*a*, 165*b*, and a connector 160*a*.

Figure 10I:
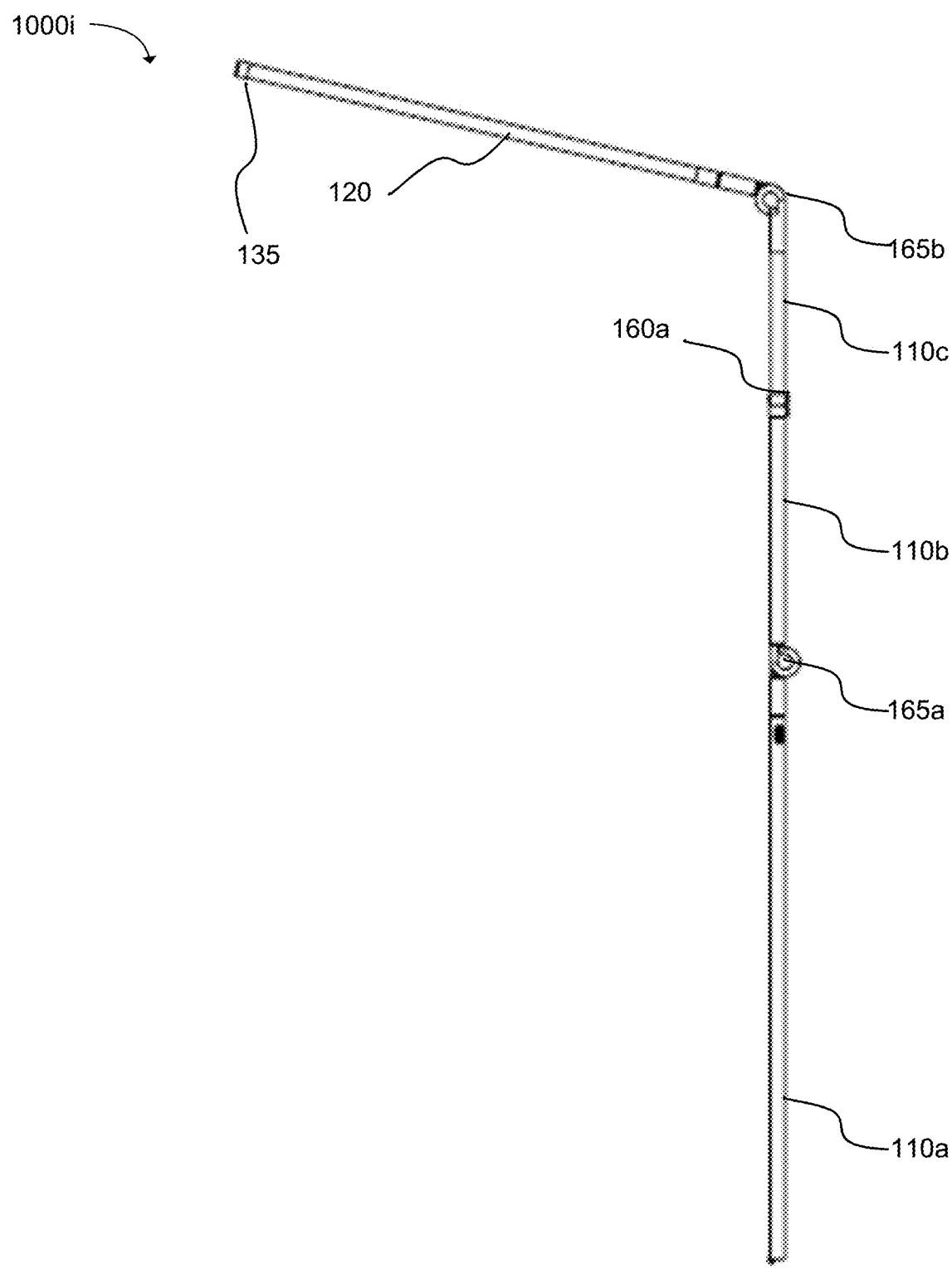
FIG. 10I illustrates a side view of an extendible outdoor portable light in accordance with an example embodiment.

In another example, FIG. 10I illustrates a side view of an extendible outdoor portable light 1000*i* comprising frame segments 110*a*, 110*b*, 110*c*, a light segment 120, a cap 135, pivots 165*a*, 165*b*, and a connector 160*a*.

Figure 10J:
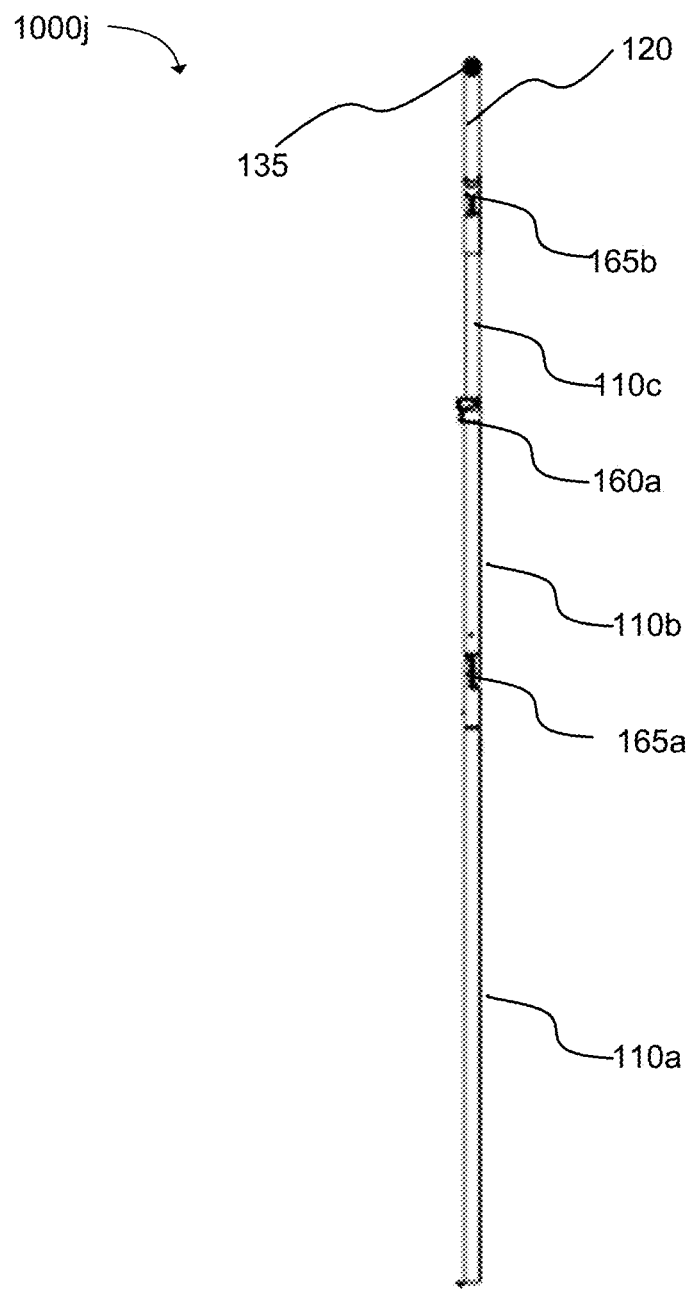
FIG. 10J illustrates a front view of an extendible outdoor portable light in accordance with an example embodiment.

In another example, FIG. 10J illustrates a front view of an extendible outdoor portable light 1000*j* comprising frame segments 110*a*, 110*b*, 110*c*, a light segment 120, a cap 135, pivots 165*a*, 165*b*, and a connector 160*a*.

Figure 10K:
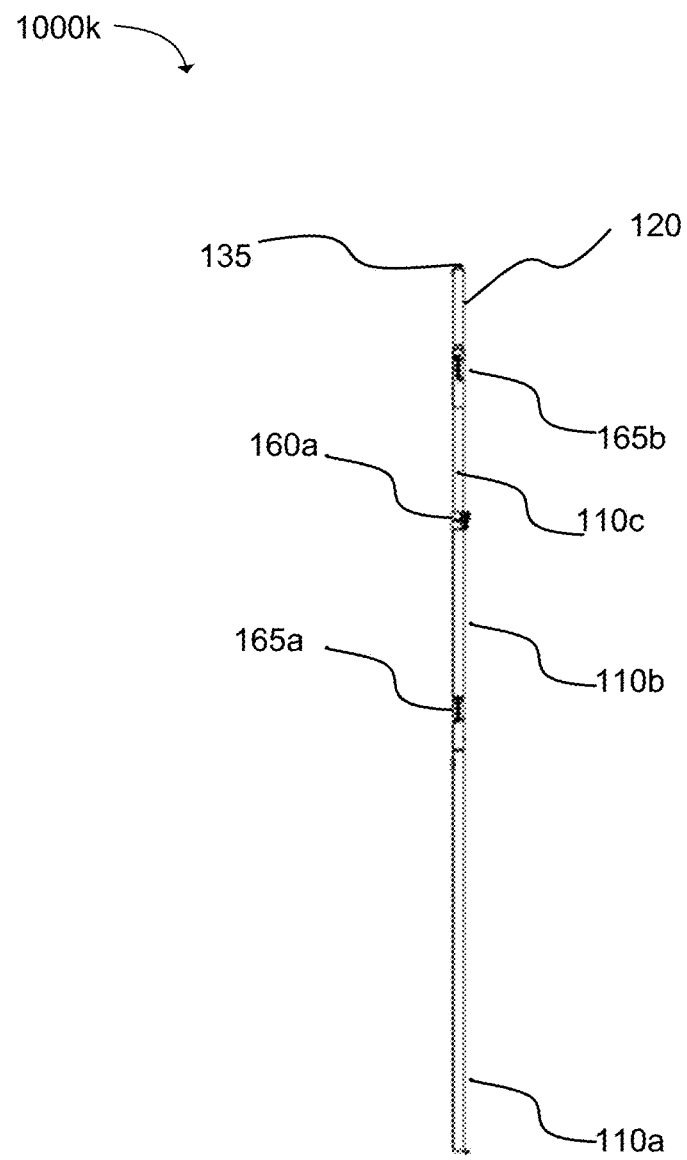
FIG. 10K illustrates an side view of an extendible outdoor portable light in accordance with an example embodiment.

In another example, FIG. 10K illustrates a side view of an extendible outdoor portable light 1000*k* comprising frame segments 110*a*, 110*b*, 110*c*, a light segment 120, a cap 135, pivots 165*a*, 165*b*, and a connector 160*a*.

Figure 10L:
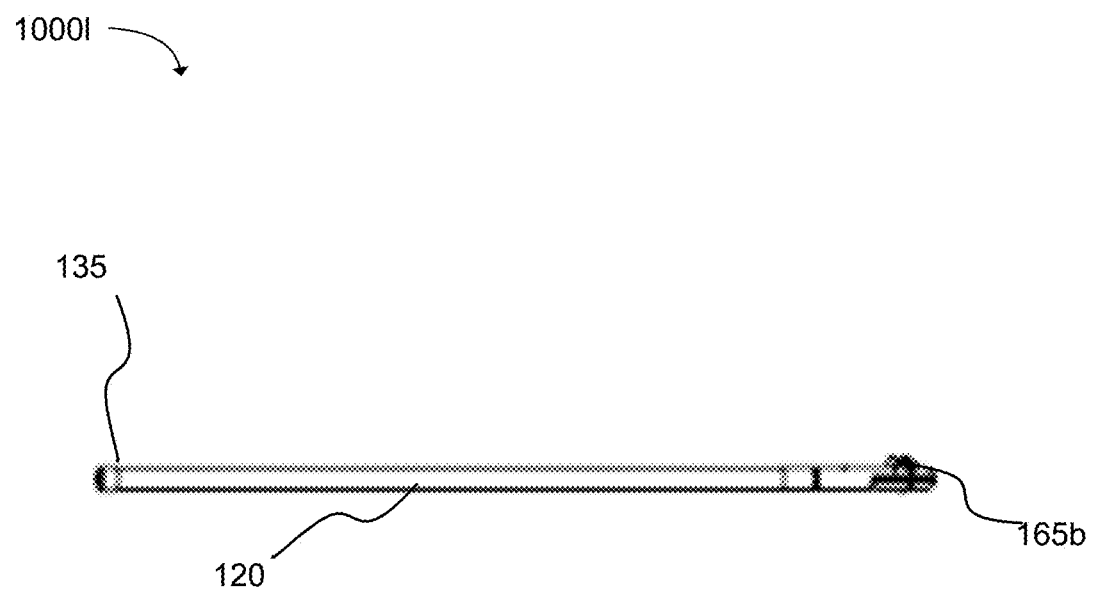
FIG. 10L illustrates a top view of an extendible outdoor portable light in accordance with an example embodiment.

In another example, FIG. 10L illustrates a top view of an extendible outdoor portable light 10001 showing light segment 120, a cap 135, and pivot 165*b*.

Figure 10M:
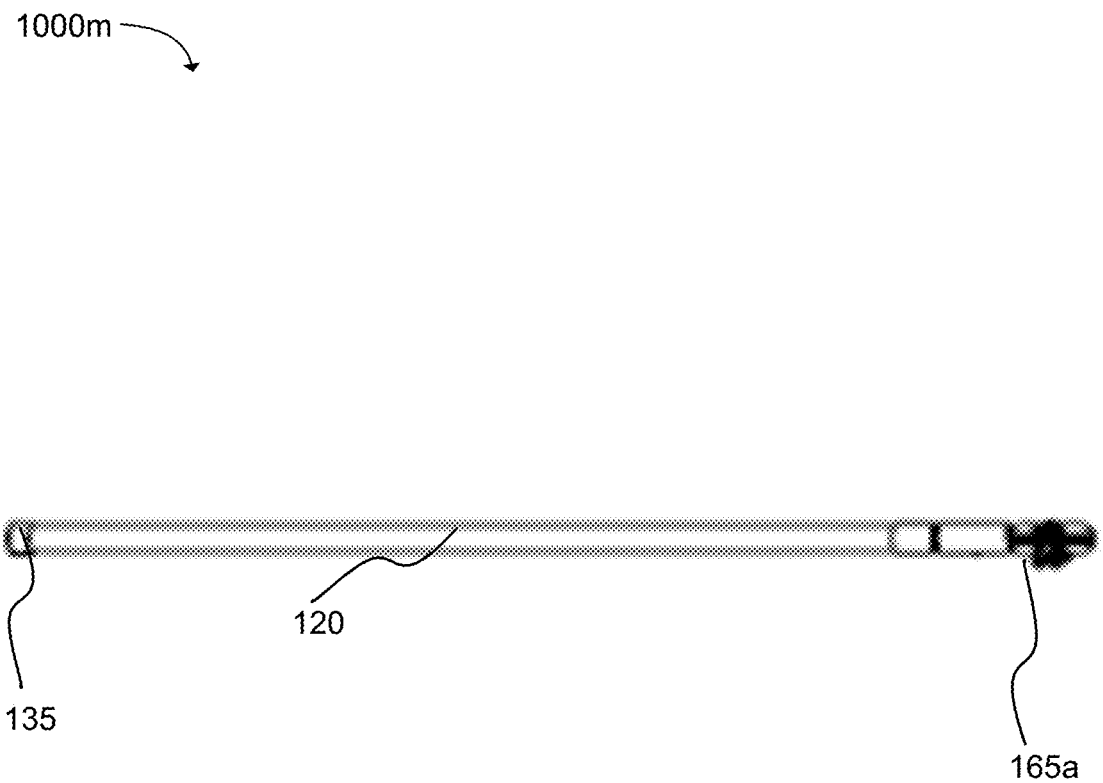
FIG. 10M illustrates a bottom view of an extendible outdoor portable light in accordance with an example embodiment.

In another example, FIG. 10M illustrates a bottom view of an extendible outdoor portable light 1000*m* showing light segment 120, a cap 135, and pivot 165*a*.

In another example, FIG. 11 illustrates a power supply 1100 for an outdoor portable light comprising a power supply 180 being a CLA power supply 180*b*, a CLA 185, and a CLA socket 170*a*.

FIG. 12 illustrates a computing device 1210 on which modules of this technology may execute. A computing device 1210 is illustrated on which a high-level example of the technology may be executed. The computing device 1210 may include one or more processors 1202 that are in communication with memory devices 1204. The computing device 1210 may include a local communication interface 1218 for the components in the computing device. For example, the local communication interface 1218 may be a local data bus and/or any related address or control busses as may be desired.

The memory device 1204 may contain modules 1230 that are executable by the processor(s) 1202 and data for the modules 1230. The modules 1230 can include a power module, a data collection module, a controller module, the like, and other modules. The modules 1230 may execute the functions described earlier. A data store 1222 may also be located in the memory device 1204 for storing data related to the modules 1230 and other applications along with an operating system that is executable by the processor(s) 1202.

A power module can be configured to power the electronic component. Any power source sufficient to adequately power the electronic component can be used. Batteries, capacitors, solar panels (e.g., flexible solar panels) and/or other power sources (e.g., ambient radio energy, solar energy, optical remote charging, vibration energy, kinetic energy, thermal energy, etc.) may be selected in view of the electronic component's intended purpose and duration and nature of operation. In one aspect, the power module can include a battery. In one example the battery can be a rechargeable battery. Other components can be included in the power module, for example, wires and electrical connections used to operably connect the power module to other modules within the electronic component that use power for their operation. In one specific example, the power module may include components that inductively charge the battery when exposed to an adequate external influence, such as a wireless or magnetic influence. In such embodiment, if charging of the battery is desired, the proper external influence can be brought within a sufficient range to operate the inductive components and charge the battery without physically accessing the electronic component.

Other applications may also be stored in the memory device 1204 and may be executable by the processor(s) 1202. Components or modules discussed in this description that may be implemented in the form of software using high-level programming languages that are compiled, interpreted, or executed using a hybrid of the methods.

The computing device 1210 may also have access to I/O (input/output) devices 1214 that are usable by the computing device 1210. One example of an I/O device is a display screen 1240 that is accessible to the computing device 1210. Networking devices 1216 and similar communication devices may be included in the computing device. The networking devices 1216 may be wired or wireless networking devices that connect to the internet, a LAN, WAN, or other computing network.

The components or modules that are shown as being stored in the memory device 1204 may be executed by the processor(s) 1202. The term "executable" may mean a program file that is in a form that may be executed by a processor 1202. For example, a program in a higher-level language may be compiled into machine code in a format that may be loaded into a random-access portion of the memory device 1204 and executed by the processor 1202, or source code may be loaded by another executable program and interpreted to generate instructions in a random-access portion of the memory to be executed by a processor 1202. The executable program may be stored in any portion or component of the memory device 1204. For example, the memory device 1204 may be random access memory (RAM), read only memory (ROM), flash memory, a solid-state drive, memory card, a hard drive, optical disk, floppy disk, magnetic tape, or any other memory components.

The processor 1202 may represent multiple processors and the memory device 1204 may represent multiple memory units that operate in parallel to the processing circuits. This may provide parallel processing channels for the processes and data in the system. The local communication interface 1218 may be used as a network to facilitate communication between any of the multiple processors and multiple memories. The local communication interface 1218 may use additional systems designed for coordinating communication such as load balancing, bulk data transfer and similar systems.

Figure 13:
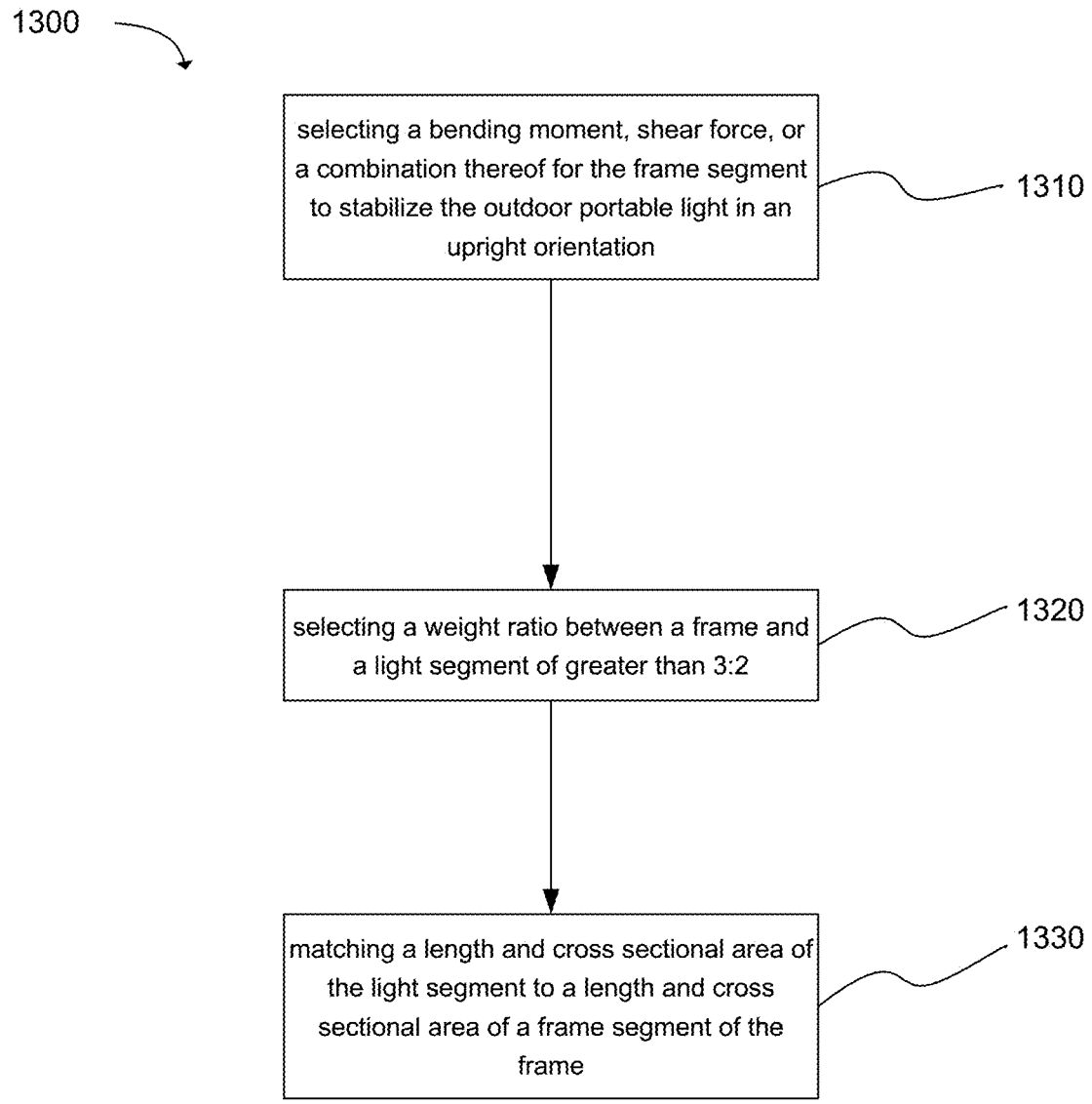
FIG. 13 shows a method for stabilizing an outdoor portable light in accordance with an example embodiment.

FIG. 13 depicts aspects of a method for stabilizing an outdoor portable light, as described in the flowchart. The method can comprise selecting a bending moment, shear force, or a combination thereof for the frame segment to stabilize the outdoor portable light in an upright orientation, as in block 610. The method 1300 can comprise selecting a weight ratio between a frame and a light segment of greater than 3:2, as in block 620. The method can matching a length and cross-sectional area of the light segment to a length and cross-sectional area of a frame segment of the frame, as in block 630.

In one aspect, the method can comprise selecting a total curvature for an arcuate frame segment of the frame of less than about 10°, 30°, 45°. In another aspect, the method can comprise selecting a circumference for the frame segment of the frame of from about 80 mm to about 120 mm. In another aspect, the method can comprise selecting a circumference for the light segment of from about 80 mm to about 120 mm. In another aspect, the method can comprise selecting a total height to total width ratio between the total height of the outdoor portable light and the total width of the outdoor portable light of from about 3:1 to about 3:2. In another aspect, the method can comprise selecting the Young's modulus for the frame segment of from about 67 GPa to about 72 GPa.

Figure 14:
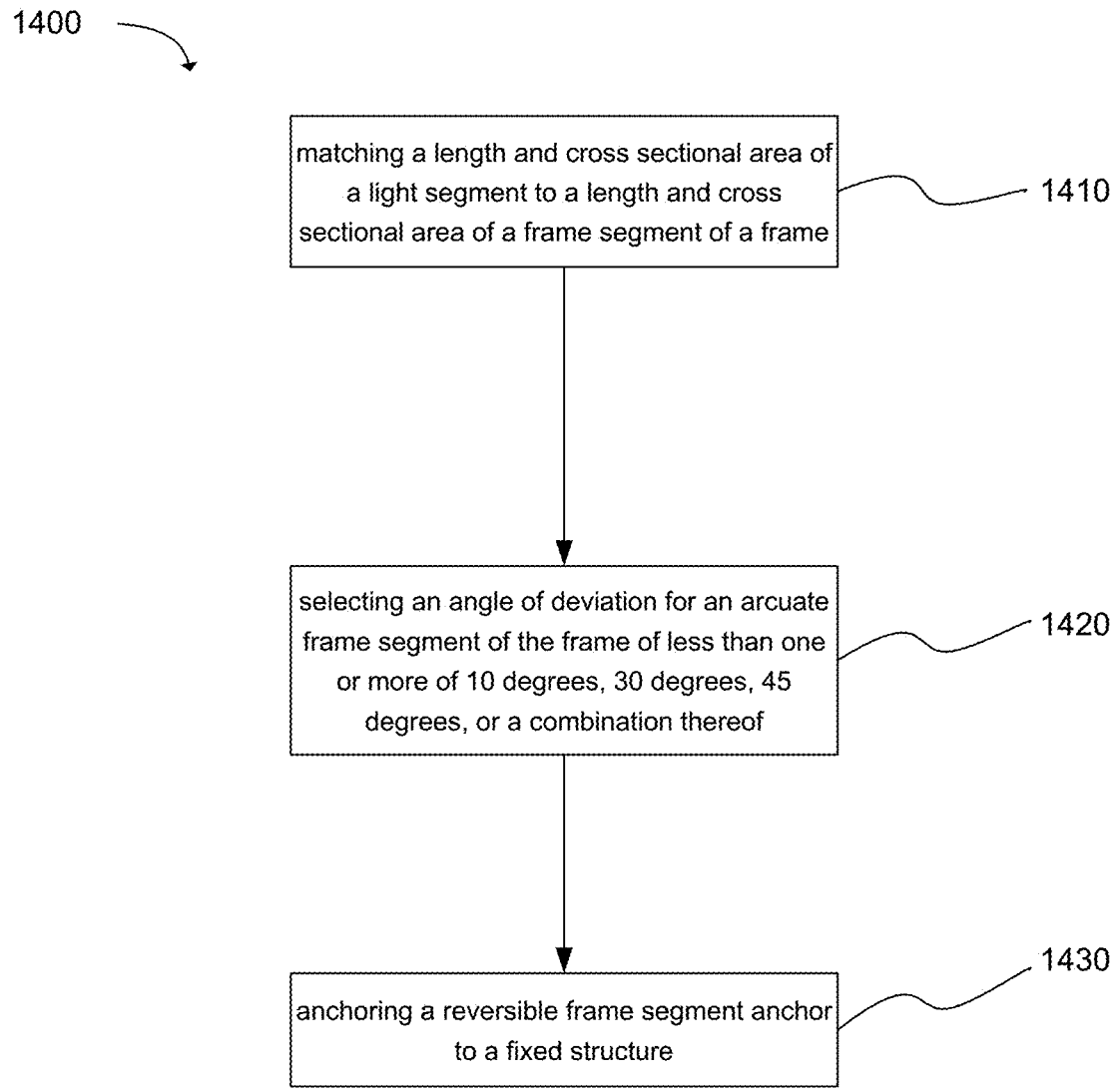
FIG. 14 shows a method for facilitating assembly and disassembly of an outdoor portable light in accordance with an example embodiment.

FIG. 14 depicts aspects of a method 1400 for facilitating assembly and disassembly of an outdoor portable light, as described in the flowchart. The method 1400 can comprise matching a length and cross-sectional area of a light segment to a length and cross-sectional area of a frame segment of a frame, as in block 1410. The method 1400 can comprise selecting a total curvature for an arcuate frame segment of the frame of less than about 10°, 30°, 45°, as in block 1420. The method 1400 can comprise anchoring a reversible frame segment anchor to a fixed structure, as in block 1430.

In another aspect, the method can comprise coupling the light segment to a portable power source. In another aspect, the method can comprise housing a power source within the frame segment. In another aspect, the method can comprise retracting an additional frame segment into the frame segment. In another aspect, the method can comprise collapsing the additional frame segment to position the additional frame segment in a substantially parallel orientation relative to the frame segment.

It is noted that no specific order is required in these methods unless used by the claims set forth herein, though generally in some embodiments, the method operations can be carried out sequentially.

EXAMPLES EMBODIMENTS

The following examples pertain to specific technology embodiments and point out specific features, elements, or steps that can be used or otherwise combined in achieving such embodiments.

In one example there is provided an outdoor portable light, comprising a frame including a frame segment having a frame segment length and cross-sectional area; and a light segment having a light segment length and cross-sectional area that is substantially equal to the frame segment length and cross-sectional area, wherein the light segment comprises: a light source housing holding a light source strip.

In one example of an outdoor portable light, the frame comprises an additional frame segment having an additional frame segment length and cross-sectional area that is substantially equal to the frame segment length and cross-sectional area.

In one example of an outdoor portable light, the frame segment comprises a straight frame segment or an arcuate frame segment.

In one example of an outdoor portable light, the frame segment comprises a straight frame segment that has a total curvature from a first end to a second end of less than one or more of about 10°, 30°, 45°, or a combination thereof.

In one example of an outdoor portable light, the frame segment comprises an arcuate frame segment that has a total curvature from a first end to a second end of from about 5° to about 180°.

In one example of an outdoor portable light, the frame segment is a straight frame segment that is coupled to a second frame segment that is an arcuate frame segment; and the second frame segment is coupled to the light segment.

In one example of an outdoor portable light, the frame segment is a first straight frame segment that is coupled to a second frame segment that is a second straight frame segment; a third frame segment is a first arcuate frame segment that is coupled to the second frame segment and a fourth frame segment that is a second arcuate frame segment; and the fourth frame segment is coupled to the light segment.

In one example of an outdoor portable light, a weight ratio between a light segment weight and a frame segment weight is from about 5:1 to about 1:5.

In one example of an outdoor portable light, a weight ratio between a light segment weight and a frame segment weight is from about 3:1 to about 1:1.

In one example of an outdoor portable light, a weight ratio between a light segment weight and a frame segment weight is from about 2.5:1 to about 1.5:1.

In one example of an outdoor portable light, a weight ratio between a light segment weight and a frame segment weight is about 2:1.

In one example of an outdoor portable light, a weight of the light segment is less than one or more of about 5 pounds, about 3.5 pounds, about 2.5 pounds, about 1.5 pounds, or a combination thereof.

In one example of an outdoor portable light, a weight of the frame segment is less than one or more of about 5 pounds, about 3.5 pounds, about 2.5 pounds, about 1.5 pounds, or a combination thereof.

In one example of an outdoor portable light, the light segment length and the frame segment length are substantially equal when a light segment length to frame segment length ratio is from about 3:2 to about 2:3.

In one example of an outdoor portable light, the light segment length and the frame segment length are substantially equal when a light segment length to frame segment length ratio is from about 10:9 to about 9:10.

In one example of an outdoor portable light, the light segment cross-section area and the frame segment cross-sectional area are substantially equal when a light segment cross-sectional area to frame segment cross-sectional area ratio is from about 3:2 to about 2:3.

In one example of an outdoor portable light, the light segment cross-sectional area and the frame segment cross-sectional area are substantially equal when a light segment cross-sectional area to frame segment cross-sectional area ratio is from about 10:9 to about 9:10.

In one example of an outdoor portable light, a frame segment thickness or a light segment thickness is from about 0.12 mm to about 8.2 mm.

In one example of an outdoor portable light, a frame segment thickness or a light segment thickness is from about 0.31 mm to about 3.2 mm.

In one example of an outdoor portable light, a frame segment thickness or a light segment thickness is from about 0.8 mm to about 1.2 mm.

In one example of an outdoor portable light, a frame segment circumference or a light segment circumference is from about 40 mm to about 160 mm.

In one example of an outdoor portable light, a frame segment circumference or a light segment circumference is from about 80 mm to about 120 mm.

In one example of an outdoor portable light, a frame segment circumference or a light segment circumference is from about 95 mm to about 105 mm.

In one example of an outdoor portable light, a total height to total width ratio between the total height of the outdoor portable light and the total width of the outdoor portable light is from about 10:1 to about 1:1.

In one example of an outdoor portable light, a total height to total width ratio between the total height of the outdoor portable light and the total width of the outdoor portable light is from about 5:1 to about 2:1.

In one example of an outdoor portable light, a total height to total width ratio between the total height of the outdoor portable light and the total width of the outdoor portable light is from about 3:1 to about 3:2.

In one example of an outdoor portable light, a total weight of the outdoor portable light is less than one or more of about 15 pounds, about 12.5 pounds, about 10 pounds, about 8 pounds, about 5 pounds, about 4.5 pounds, or a combination thereof.

In one example of an outdoor portable light, the frame segment has a Young's modulus of from about 30 GPa to about 400 GPa.

In one example of an outdoor portable light, the frame segment has a Young's modulus of from about 65 GPa to about 75 GPa.

In one example of an outdoor portable light, the frame segment has a Young's modulus of from about 67 GPa to about 72 GPa.

In one example of an outdoor portable light, the outdoor portable light is operable to remain upright when subjected to a point force at a halfway point of less than about 100 N.

In one example of an outdoor portable light, the outdoor portable light is operable to remain upright when subjected to a wind speed of about 30 mph.

In one example of an outdoor portable light, a number of light source recesses is from 1 to 36, or a number of light source strips is from 1 to 36.

In one example of an outdoor portable light, the frame segment holds the light segment at an angle from horizontal of from about 0° to about 60°.

In one example of an outdoor portable light, the light further includes a reversible frame segment anchor operable to anchor the frame segment to a fixed structure.

In one example of an outdoor portable light, the reversible frame segment anchor comprises one or more of a stake, a spike, a bolt, a screw, a string, a strap, Velcro, clips, snaps, zippers, hooks, loop closures, or a combination thereof.

In one example of an outdoor portable light, the frame segment further comprises a Y-shaped connector, a T-shaped connector, a 3-pronged connector, a cable, a barrel socket, or a combination thereof.

In one example of an outdoor portable light, the light segment further comprises a socket operable to connect to a power source.

In one example of an outdoor portable light, the light segment further comprises a wire recess holding a wire coupled between the light source strip and a power source.

In one example of an outdoor portable light, the light segment is operable to be positioned adjacent the frame segment without removing wiring between the light segment and the frame segment.

In one example of an outdoor portable light, an additional light segment is operable to be coupled between the light segment and the frame segment.

In one example of an outdoor portable light, the light source strip is an LED strip.

In one example of an outdoor portable light, the LED strip is an RGB LED strip.

In one example of an outdoor portable light, the RGB LED strip is operable to emit an amber color.

In one example of an outdoor portable light, the light further includes a controller operable to adjust an emitted color to a different emitted color.

In one example of an outdoor portable light, the light segment is operable to irradiate from about 10 lumens to about 15,000 lumens.

In one example of an outdoor portable light, the light segment is operable to irradiate from about 1,000 lumens to about 10,000 lumens.

In one example of an outdoor portable light, the light segment is operable to irradiate from about 5,000 lumens to about 7,500 lumens.

In one example of an outdoor portable light, the light segment is operable to irradiate from about 6,000 lumens to about 6,500 lumens.

In one example of an outdoor portable light, the light segment is operable to receive power from a portable power source.

In one example of an outdoor portable light, a power source provides a voltage of from about 1 V to about 120 V.

In one example of an outdoor portable light, a power source provides a voltage of from about 6 V to about 36 V.

In one example of an outdoor portable light, a power source provides a voltage of from about 18 V to about 30 V.

In one example of an outdoor portable light, a power source provides a wattage of from about 1 W to about 300 W.

In one example of an outdoor portable light, a power source provides a wattage of from about 24 W to about 120 W.

In one example of an outdoor portable light, a power source provides a wattage of from about 45 W to about 75 W.

In one example of an outdoor portable light, the light further includes a power source comprising a portable battery that is housed within the frame segment.

In one example of an outdoor portable light, the frame segment is interchangeable with a different frame segment housing a different portable battery.

In one example of an outdoor portable light, the light further includes a battery segment having a battery segment length and cross-sectional area that is substantially equal to the frame segment length and cross-sectional area.

In one example of an outdoor portable light, the frame segment comprises a cigarette lighter adaptor (CLA) socket configured to be coupled to a CLA and a CLA power supply.

In one example of an outdoor portable light, the light further includes an additional frame segment coupled to a second end of the frame segment, distal from a first end of the frame segment, wherein the additional frame segment is retractable into the frame segment and linearly extendible out of the frame segment; or the additional frame segment is operable to pivot relative to the frame segment.

In one example of an outdoor portable light, the light further includes an additional frame segment coupled to a second end of the frame segment, distal from a first end of the frame segment, wherein the additional frame segment is operable to pivot relative to the frame segment while maintaining wind-resistant stability.

In one example of an outdoor portable light, the light further includes an additional frame segment coupled to a second end of the frame segment, distal from a first end of the frame segment, wherein the additional frame segment is retractable into the frame segment to facilitate disassembly; or the additional frame segment is collapsible to be positioned in a substantially parallel orientation relative to the frame segment to facilitate disassembly.

In one example of an outdoor portable light, further includes an outer housing.

In one example there is provided a method for stabilizing an outdoor portable light, comprising selecting a bending moment, shear force, or a combination thereof for the frame segment to stabilize the outdoor portable light in an upright orientation, selecting a weight ratio between a frame and a light segment of greater than 3:2, and matching a length and cross-sectional area of the light segment to a length and cross-sectional area of a frame segment of the frame.

In one example of a method for stabilizing an outdoor portable light, the method of claim 5, includes selecting a total curvature for an arcuate frame segment of the frame of less than one or more of about 10°, 30°, 45°, or a combination thereof, or selecting a circumference for the frame segment of the frame of from about 80 mm to about 120 mm; or selecting a circumference for the light segment of from about 80 mm to about 120 mm; or selecting a total height to total width ratio between the total height of the outdoor portable light and the total width of the outdoor portable light of from about 3:1 to about 3:2; or selecting the Young's modulus for the frame segment of from about 67 GPa to about 72 GPa; or selecting the bending moment for the frame segment of from about 49 N*m to about 81 N*m; or selecting the shear force for the frame segment of from about 8 N*m to about 15 N*m.

In one example there is provided a method for facilitating assembly and disassembly of an outdoor portable light, comprising matching a length and cross-sectional area of a light segment to a length and cross-sectional area of a frame segment of a frame; selecting a total curvature for an arcuate frame segment of the frame of less than one or more of about 10°, 30°, 45°, or a combination thereof; and anchoring a reversible frame segment anchor to a fixed structure.

In one example of a method for facilitating assembly and disassembly of an outdoor portable light, the method includes coupling the light segment to a portable power source; or housing a power source within the frame segment; or retracting an additional frame segment into the frame segment; or collapsing the additional frame segment to position the additional frame segment in a substantially parallel orientation relative to the frame segment.

Of course, it is to be understood that the above-described arrangements are illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been described above with particularity and detail in connection with what is presently deemed to be the most practical embodiments of the disclosure, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. An outdoor portable light, comprising:
  a frame facilitating assembly and disassembly of the outdoor portable light, the frame comprising:
    at least one straight frame segment having a frame segment length and cross-sectional area,
    a portable battery housed within the at least one straight frame segment, and
    at least one arcuate frame segment having an additional frame segment length and cross-sectional area substantially equal to the frame segment length and cross-sectional area of the at least one straight frame segment,
    wherein the at least one straight frame segment and the at least one arcuate frame segment each comprise a connector configured to couple the frame segment to an adjacent frame segment or a light segment; and
  the light segment having a light segment length and cross-sectional area that is substantially equal to the frame segment length and cross-sectional area, wherein the light segment comprises: a light source housing holding a light source strip.

2. The outdoor portable light of claim 1, wherein the frame comprises an additional frame segment having an additional frame segment length and cross-sectional area that is substantially equal to the frame segment length and cross-sectional area.

3. The outdoor portable light of claim 2, wherein the additional frame segment comprises a straight frame segment or an arcuate frame segment.

4. The outdoor portable light of claim 1, wherein the at least one straight frame segment has a total curvature from a first end to a second end of less than one or more of about 10°, 30°, 45°, or a combination thereof.

5. The outdoor portable light of claim 1, wherein the at least one arcuate frame segment has a total curvature from a first end to a second end of from about 5° to about 180°.

6. The outdoor portable light of claim 1, wherein:
  the at least one straight frame segment is coupled to the at least one arcuate frame segment; and
  the at least one arcuate frame segment is coupled to the light segment.

7. The outdoor portable light of claim 1, wherein:
the at least one straight frame segment comprises two straight frame segments that are coupled together;
the at least one arcuate frame segment comprises two arcuate frame segments that are coupled together, where a first arcuate frame segment of the two arcuate frame segments is coupled to one of the two straight frame segments; and
a second arcuate frame segment of the two arcuate frame segments is coupled to the light segment.

8. The outdoor portable light of claim 1, wherein a weight ratio between a light segment weight and a frame segment weight is from about 5:1 to about 1:5.

9. The outdoor portable light of claim 1, wherein a weight of the light segment or the frame segment or a combination thereof is less than one or more of about 5 pounds, about 3.5 pounds, about 2.5 pounds, about 1.5 pounds, or a combination thereof.

10. The outdoor portable light of claim 1, wherein the light segment length and the frame segment length are substantially equal when a light segment length to frame segment length ratio is from either about 3:2 to about 2:3, or about 10:9 to about 9:10.

11. The outdoor portable light of claim 1, wherein the light segment cross-sectional area and the frame segment cross-sectional area are substantially equal when a light segment cross-sectional area to frame segment cross-sectional area ratio is from about 3:2 to about 2:3, or about 10:9 to about 9:10.

12. The outdoor portable light of claim 1, wherein a frame segment thickness or a light segment thickness is from about 0.12 mm to about 8.2 mm.

13. The outdoor portable light of claim 1, wherein a frame segment circumference or a light segment circumference is from about 40 mm to about 160 mm.

14. The outdoor portable light of claim 1, wherein a total height to total width ratio between the total height of the outdoor portable light and the total width of the outdoor portable light is from about 10:1 to about 1:1.

15. The outdoor portable light of claim 1, wherein a total weight of the outdoor portable light is less than one or more of about 15 pounds, about 12.5 pounds, about 10 pounds, about 8 pounds, about 5 pounds, about 4.5 pounds, or a combination thereof.

16. The outdoor portable light of claim 1, wherein the frame segment has a Young's modulus of from about 30 GPa to about 400 GPa.

17. The outdoor portable light of claim 1, wherein the outdoor portable light is operable to remain upright when subjected to a point force at a halfway point of less than about 100 N.

18. The outdoor portable light of claim 1, wherein the outdoor portable light is operable to remain upright when subjected to a wind speed of about 30 mph.

19. The outdoor portable light of claim 1, wherein the frame segment holds the light segment at an angle from horizontal of from about 0° to about 60°.

20. The outdoor portable light of claim 1, further comprising a reversible frame segment anchor comprising a sleeve operable to be coupled to the at least one straight frame segment.

21. The outdoor portable light of claim 20, wherein the reversible frame segment anchor comprises one or more of a stake, a spike, a bolt, a screw, a string, a strap, Velcro, clips, snaps, zippers, hooks, loop closures, or a combination thereof.

22. The outdoor portable light of claim 1, wherein the at least one straight frame segment is interchangeable with a different frame segment housing a different portable battery.

23. The outdoor portable light of claim 1, further comprising an additional battery segment having a battery segment length and cross-sectional area that is substantially equal to the frame segment length and cross-sectional area.

24. The outdoor portable light of claim 1, further comprising a reversible frame segment anchor comprising a stake configured to be set in the ground to anchor the outdoor portable light.

25. The outdoor portable light of claim 1, further comprising a reversible frame segment anchor operable to anchor the frame segment to a fixed structure, wherein the fixed structure comprises the ground, a house, a fence, a basketball hoop, a soccer goal, a tree, a tent, a wall, a vehicle.

* * * * *